United States Patent
Sauder et al.

(10) Patent No.: US 10,863,665 B2
(45) Date of Patent: Dec. 15, 2020

(54) SEED METER WITH FLOATING SINGULATOR

(71) Applicant: Precision Planting LLC, Tremont, IL (US)

(72) Inventors: Derek Sauder, Tremont, IL (US); Tim Schaefer, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 110 days.

(21) Appl. No.: 16/388,587

(22) Filed: Apr. 18, 2019

(65) Prior Publication Data

US 2019/0239419 A1 Aug. 8, 2019

Related U.S. Application Data

(60) Continuation of application No. 15/000,191, filed on Jan. 19, 2016, now Pat. No. 10,299,425, which is a division of application No. 13/804,630, filed on Mar. 14, 2013, now Pat. No. 9,265,191, which is a continuation-in-part of application No. PCT/US2012/030192, filed on Mar. 22, 2012.

(60) Provisional application No. 61/466,047, filed on Mar. 22, 2011.

(51) Int. Cl.
  *A01C 7/04* (2006.01)
  *A01C 7/12* (2006.01)
  *A01C 7/08* (2006.01)
  *A01C 7/10* (2006.01)
  *A01C 7/16* (2006.01)

(52) U.S. Cl.
  CPC ............... *A01C 7/046* (2013.01); *A01C 7/04* (2013.01); *A01C 7/044* (2013.01); *A01C 7/084* (2013.01); *A01C 7/105* (2013.01); *A01C 7/12* (2013.01); *A01C 7/123* (2013.01); *A01C 7/128* (2013.01); *A01C 7/16* (2013.01)

(58) Field of Classification Search
  CPC ........... A01C 7/04; A01C 7/044; A01C 7/046; A01C 7/084; A01C 7/105; A01C 7/12; A01C 7/123; A01C 7/128; A01C 7/16
  See application file for complete search history.

(56) References Cited

U.S. PATENT DOCUMENTS

| | | |
|---|---|---|
| 3,608,787 A | 9/1971 | Grataloup |
| 3,990,606 A | 11/1976 | Gugenhan |
| 4,450,979 A | 5/1984 | Deckler |

(Continued)

FOREIGN PATENT DOCUMENTS

| | | |
|---|---|---|
| DE | 2701982 A1 | 10/1978 |
| DE | 68916976 T2 | 3/1995 |

(Continued)

OTHER PUBLICATIONS

EP11779702.7/2637492 File History, Applicant is Maschio Gasparado S.p.A., current as of Apr. 18, 2019.

*Primary Examiner* — Alicia Torres

(57) ABSTRACT

A seed meter for an agricultural planter in which the seed disc is rotatably mounted within a seed meter housing. As the seed disc rotates, the apertures in the disc rotate along a seed aperture path through a horizontally adjacent seed pool area. The seed disc includes cavities disposed along the seed aperture path to agitate the seeds in the seed pool area. A singulator having multiple co-planar singulator surfaces is biased against the seed side surface of the seed disc.

10 Claims, 28 Drawing Sheets

(56) References Cited

U.S. PATENT DOCUMENTS

| | | | |
|---|---|---|---|
| 4,646,939 A * | 3/1987 | Herriau | B65G 21/2036 |
| | | | 221/211 |
| 4,949,869 A | 8/1990 | Ribouleau | |
| 5,170,909 A | 12/1992 | Lundie et al. | |
| 5,848,571 A * | 12/1998 | Stufflebeam | A01C 7/046 |
| | | | 111/185 |
| 6,516,733 B1 | 2/2003 | Sauder et al. | |
| 6,932,236 B2 | 8/2005 | Ven Huizen | |
| 7,093,548 B2 | 8/2006 | Eben et al. | |
| 7,152,542 B2 | 12/2006 | Eben et al. | |
| 7,228,807 B1 | 6/2007 | Venhuizen | |
| 7,617,785 B2 | 11/2009 | Wendte | |
| 7,699,009 B2 * | 4/2010 | Sauder | A01C 7/046 |
| | | | 111/185 |
| 9,578,798 B2 * | 2/2017 | Scheideler | A01C 7/20 |
| 9,675,002 B2 * | 6/2017 | Roszman | A01C 7/105 |
| 10,750,663 B2 * | 8/2020 | Garner | A01C 7/128 |
| 2002/0066743 A1 | 6/2002 | Hak | |
| 2002/0170476 A1 | 11/2002 | Bogner et al. | |
| 2005/0150442 A1 | 7/2005 | Friesen | |
| 2007/0039529 A1 | 2/2007 | Sauder et al. | |
| 2007/0125284 A1 | 6/2007 | Mariman | |
| 2010/0224110 A1 * | 9/2010 | Mariman | A01C 7/046 |
| | | | 111/11 |
| 2011/0132721 A1 | 6/2011 | Kevin et al. | |
| 2014/0109811 A1 | 4/2014 | Wilhelmi et al. | |
| 2016/0255768 A1 * | 9/2016 | Garner | A01C 7/128 |
| 2019/0230846 A1 * | 8/2019 | Koch | B65G 47/24 |

FOREIGN PATENT DOCUMENTS

| | | |
|---|---|---|
| DE | 102009043881 A1 | 3/2011 |
| DE | 102013100113 A1 | 7/2014 |
| EP | 0106299 B1 | 2/1986 |
| EP | 0536543 A1 | 4/1993 |
| EP | 2225928 A2 | 9/2010 |
| FR | 2991132 A1 | 12/2013 |

* cited by examiner

SEC. X-X

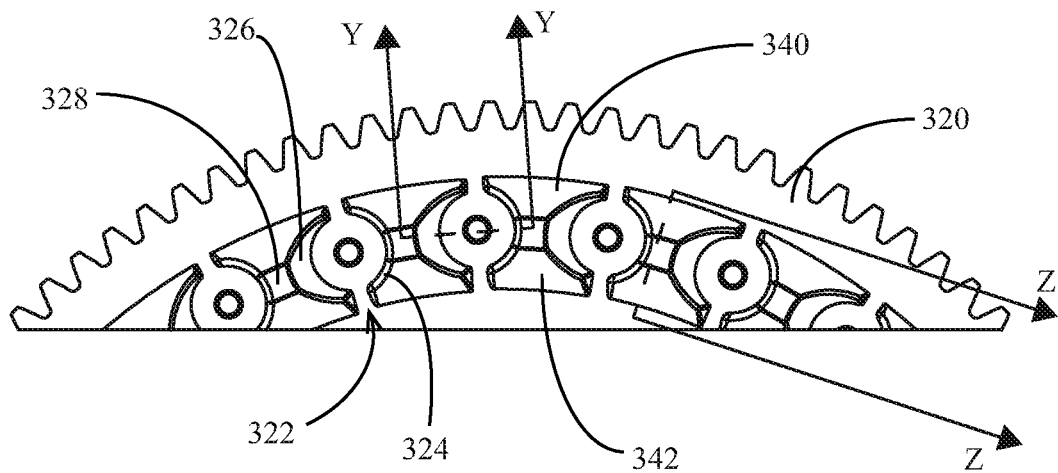
FIG. 20A
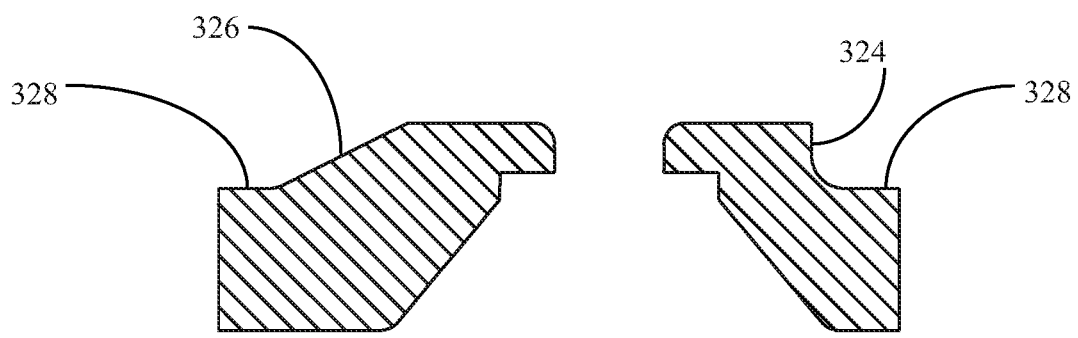
FIG. 20B          SEC. Y-Y
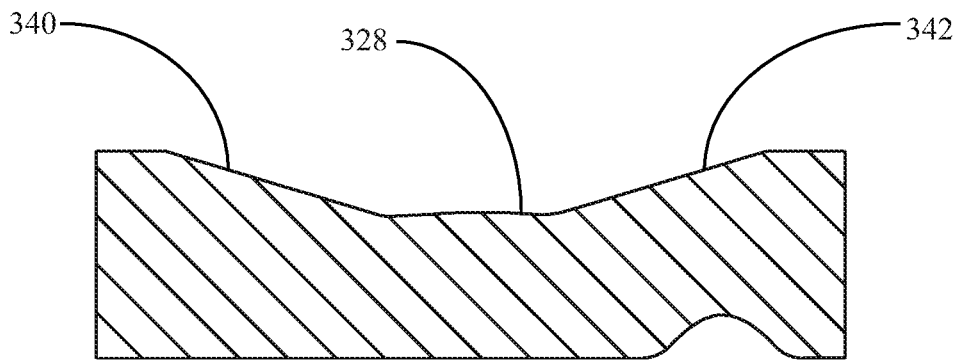
FIG. 20C          SEC. Z-Z

SEED METER WITH FLOATING SINGULATOR

CROSS-REFERENCE TO RELATED APPLICATIONS

This is a continuation of U.S. patent application Ser. No. 15/000,191, filed Jan. 19, 2016, which is a divisional of U.S. patent application Ser. No. 13/804,630, filed Mar. 14, 2013 which is a continuation-in-part of International Patent Application No. PCT/US2012/030192, filed Mar. 22, 2012 which claims the benefit of U.S. Provisional Application No. 61/466,047, filed Mar. 22, 2011.

BACKGROUND

In recent years, growers of corn and other crops have come to recognize the importance of planting individual seeds at the appropriate spacing due to increased seed and crop input prices, but also because they have the ability to monitor the economic impact of skips, doubles or misplaced seeds using modern planter monitors. For these reasons modern seed meters have been developed that include features which improve the singulation of seeds. However, each added feature increases the amount of time that the grower must spend replacing wear parts or making other adjustments prior to or during planting operations. Due to weather and other factors, the available time to plant corn and other crops is often extremely limited, with each planter required to cover hundreds of acres while limited in speed due to reduced seed meter performance at higher planting speeds.

Thus, there is a need for a seed meter having improved singulation and seed spacing capability at higher speeds and which is also easily repairable and modifiable.

BRIEF DESCRIPTION OF THE DRAWINGS

FIG. 20A is a partial side elevation view of another embodiment of a seed disc.

FIG. 20B is a cross-sectional view of a seed disc along the section 20B-20B of FIG. 20A.

FIG. 20C is a cross-sectional view of a seed disc along the section 20C-20C of FIG. 20A.

DESCRIPTION

Figure 1:
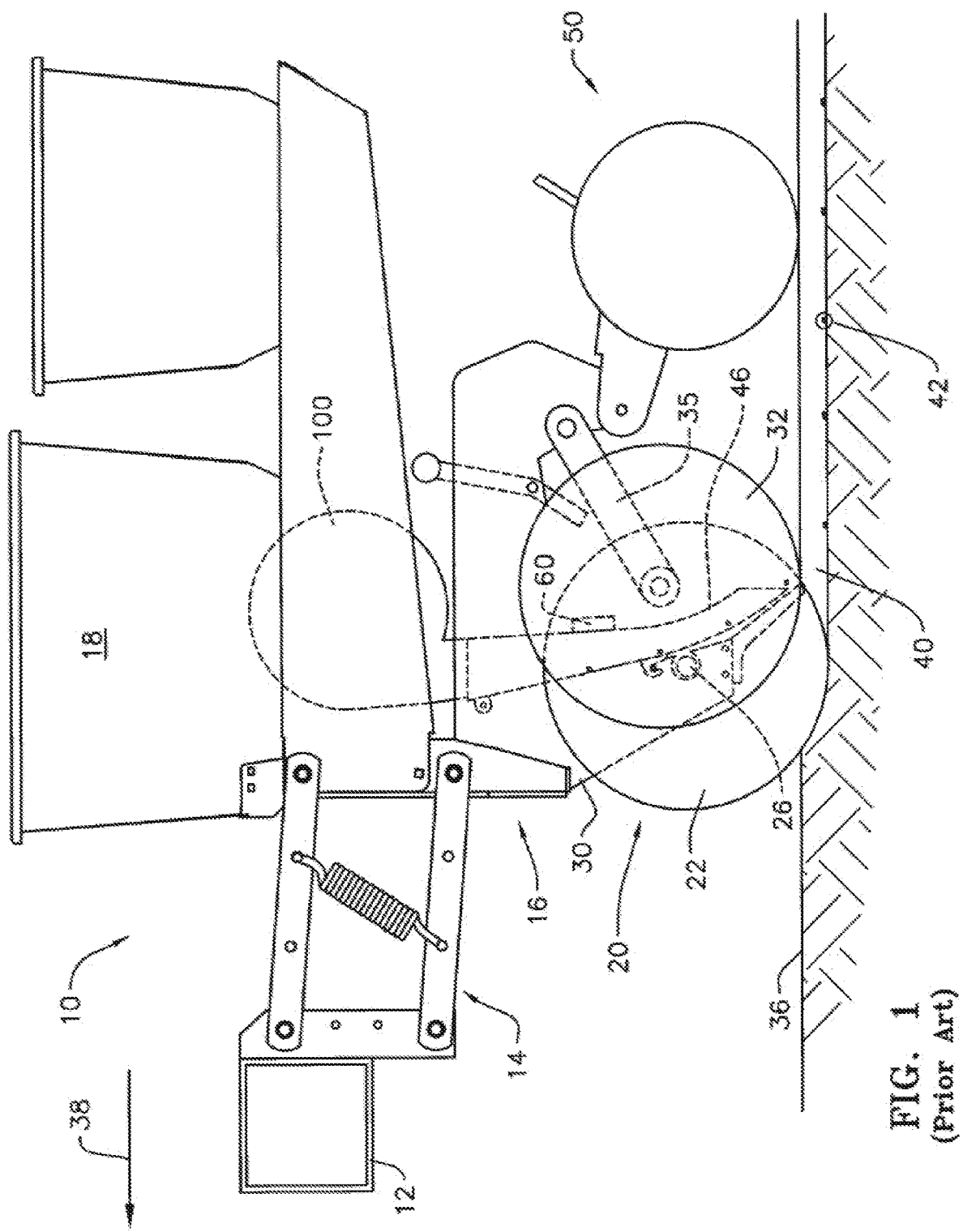
FIG. 1 illustrates a side elevation view of a single row unit of a conventional row crop planter.

Referring now to the drawings, wherein like reference numerals designate identical or corresponding parts throughout the several views, FIG. 1 illustrates a single row unit 10 of a conventional row crop planter. As is well known in the art, the row units 10 are mounted in spaced relation along the length of a transverse toolbar 12 by a parallel linkage 14 which permits each row unit 10 to move vertically independently of the toolbar and the other spaced row units in order to accommodate changes in terrain or upon the row unit encountering a rock or other obstruction as the planter is drawn through the field. Each row unit 10 includes a frame 16 which operably supports a seed hopper 18, a furrow opening assembly 20, a seed meter 100, a seed tube 46 and a furrow closing assembly 50.

The furrow opening assembly 20 comprises a pair of furrow opening discs 22 which are rotatably mounted on shafts 26 secured to a shank 30 comprising a part of the row unit frame 16. The furrow opening assembly 20 further comprises a pair of gauge wheels 32 rotatably supported by gauge wheel arms 35 also secured to the frame 16. As the planter is drawn through the field, the rotating furrow opening discs 22 cut a V-shaped furrow 40 through the soil surface 36. The egress end of the seed tube 46 is disposed between the rearwardly diverging furrow opening discs 22.

In operation, as the planter is drawn through the field along the direction of travel as indicated by the arrow 38, the seed hopper 18 communicates a constant supply of seeds 42 to the seed meter 100. The seed meter 100 meters or dispenses individual or "singulated" seeds 42 at regularly spaced intervals into the seed tube 46. The seed tube 46 directs the seeds downwardly and rearwardly between the diverging furrow opening discs 22 before depositing the seeds into the V-shaped furrow 40. The seeds are then covered with soil by the furrow closing assembly 50. A seed sensor 60 detects the passage of seeds through the seed tube 46 as is known in the art.

Novel Seed Meter Embodiments

Figure 2:
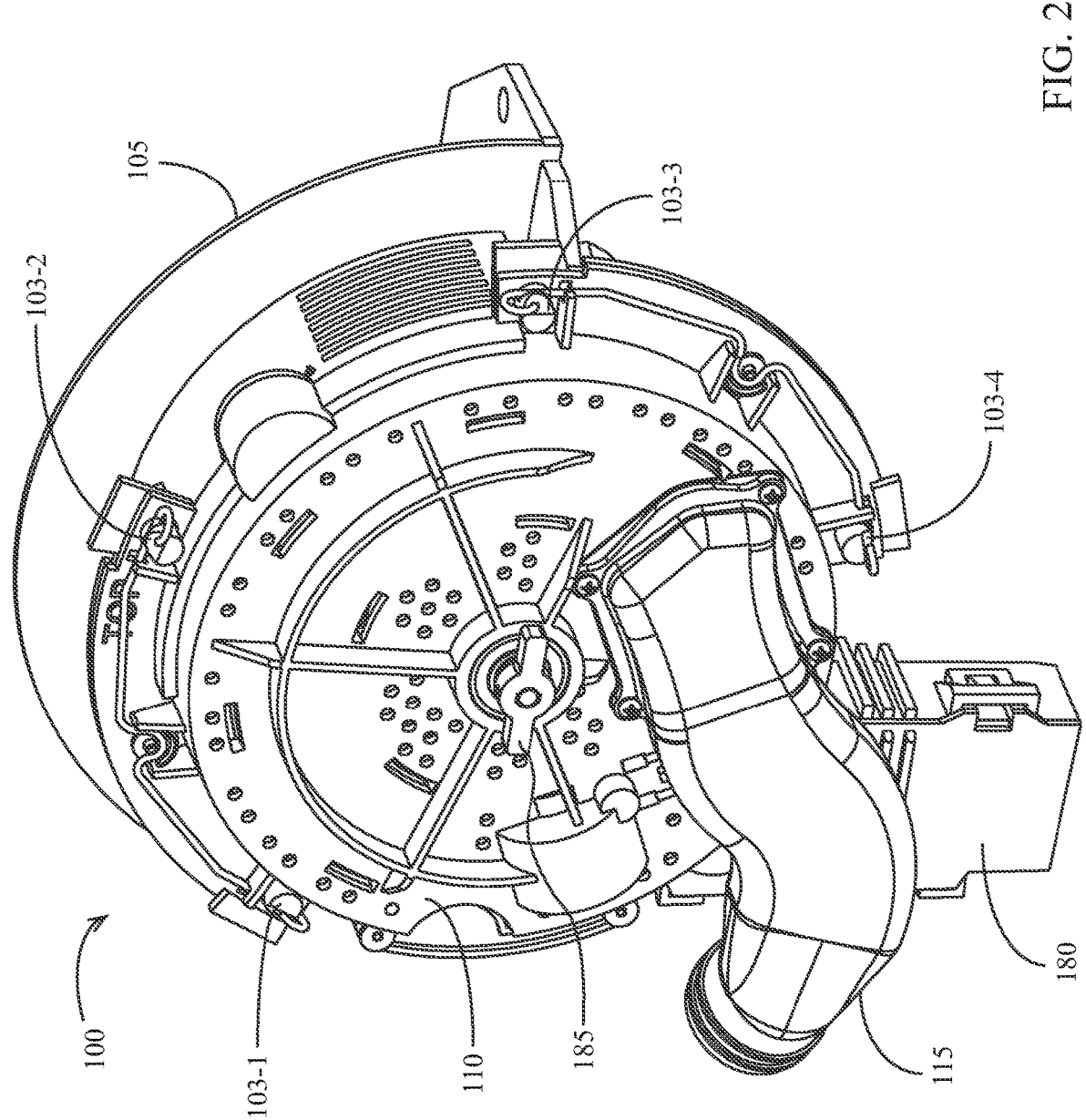
FIG. 2 is a perspective view of an embodiment of a seed meter.
Figure 3:
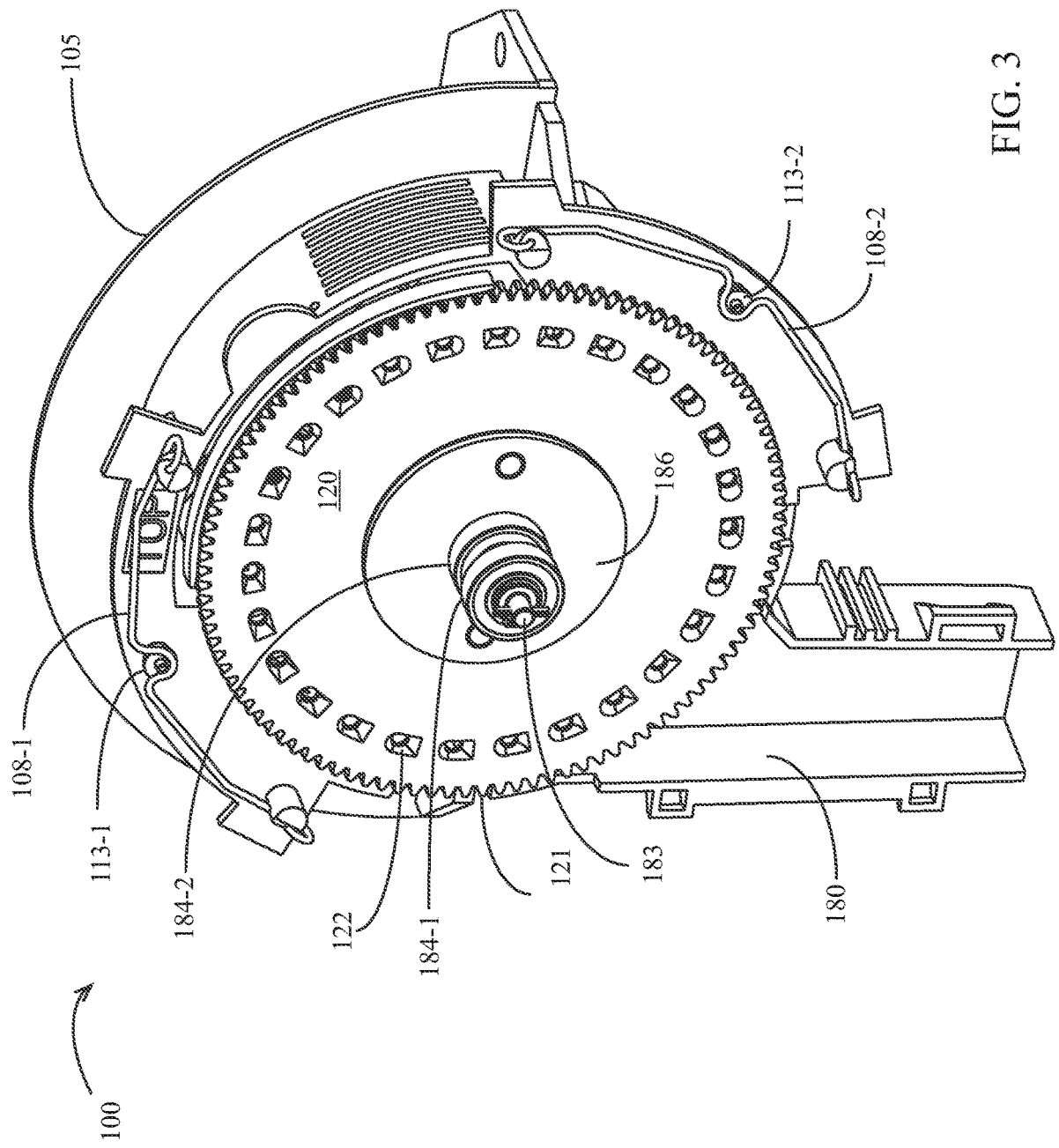
FIG. 3 is a partial perspective view of an embodiment of a seed meter.

Embodiments of a novel seed meter 100 are illustrated in FIGS. 2-20. Referring to FIGS. 2 and 3, the seed meter 100 includes a housing comprised of a vacuum cover 110 and a seed housing 105. As described further herein, the seed meter 100 functions by selecting one seed at a time from seeds communicated into the seed housing 105 and dispensing each seed through the seed exit 180. A vacuum inlet 115 is coupled to the vacuum cover 110. Vacuum hoses or tubes (not shown) connect the vacuum inlet 115 to a vacuum source (not shown) such as a vacuum impeller.

The seed housing 105 includes pivots 113 (FIG. 3) and tabs 103 (FIG. 2). When assembled, the tabs 103 extend through holes in the vacuum cover 110 such that retaining springs 108 may be biased against pivots 113 and tabs 103 to retain the seed housing 105 in position against the vacuum cover 110.

Referring to FIG. 3, the seed meter 100 is shown with the vacuum cover 110 and other components removed for clarity. A shaft 183 is rotatably coupled to bearings 184. Bearings 184 are held in place by the vacuum cover 110. A drive plate 186 is coupled to and rotates with the shaft 183. Drive plate 186 is releasably coupled to a seed disc 120. Seed disc 120 includes apertures 122 and preferably includes drive teeth 121. In operation, the seed disc 120 may be rotated by a driven gear (not shown) coupled to drive teeth 121 (as described further herein) or by a driven shaft (not shown) coupled to an adapter 185 (FIG. 2) mounted to the shaft 183.

Figure 4:
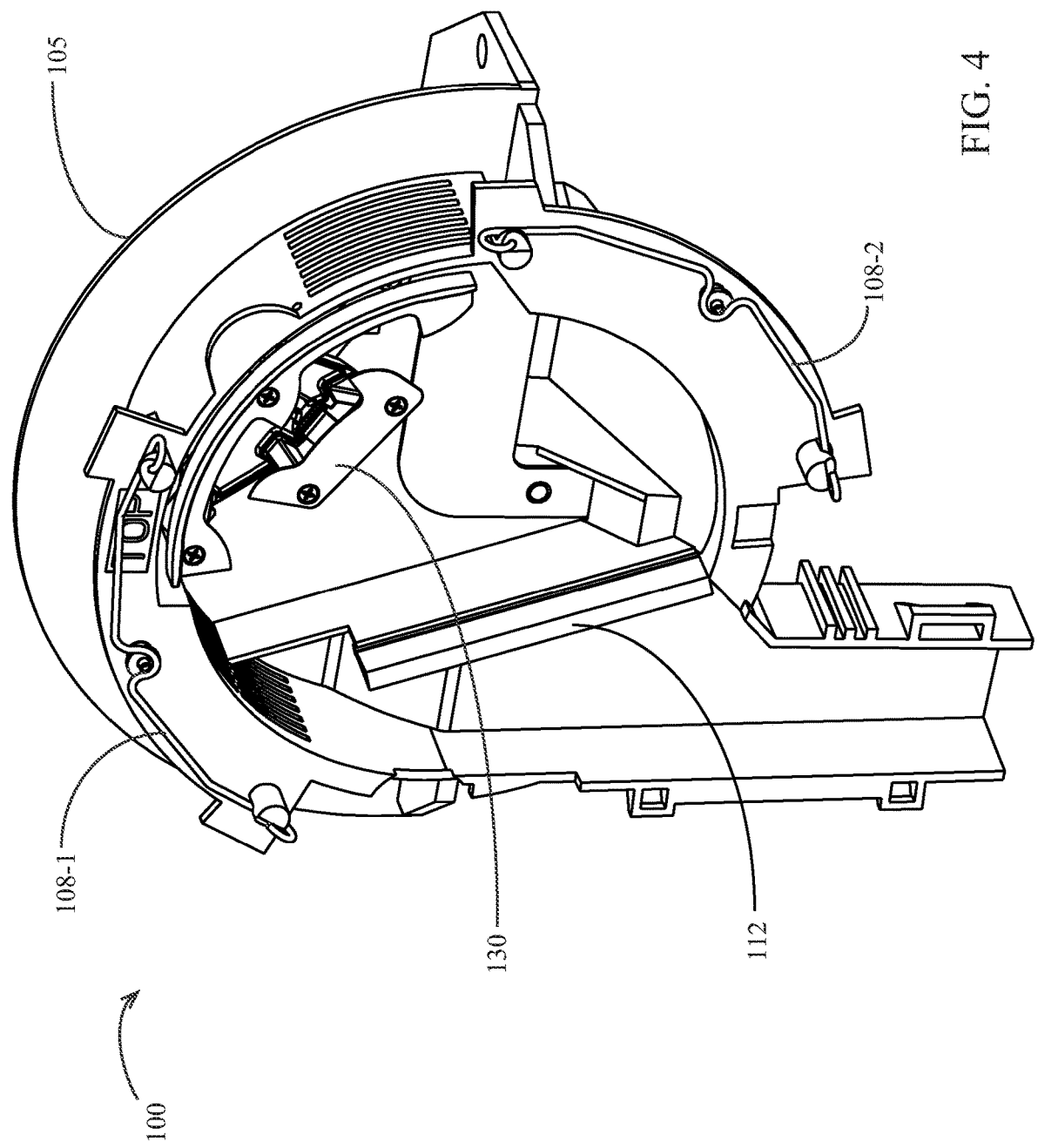
FIG. 4 is another partial perspective view of an embodiment of a seed meter.
Figure 5:
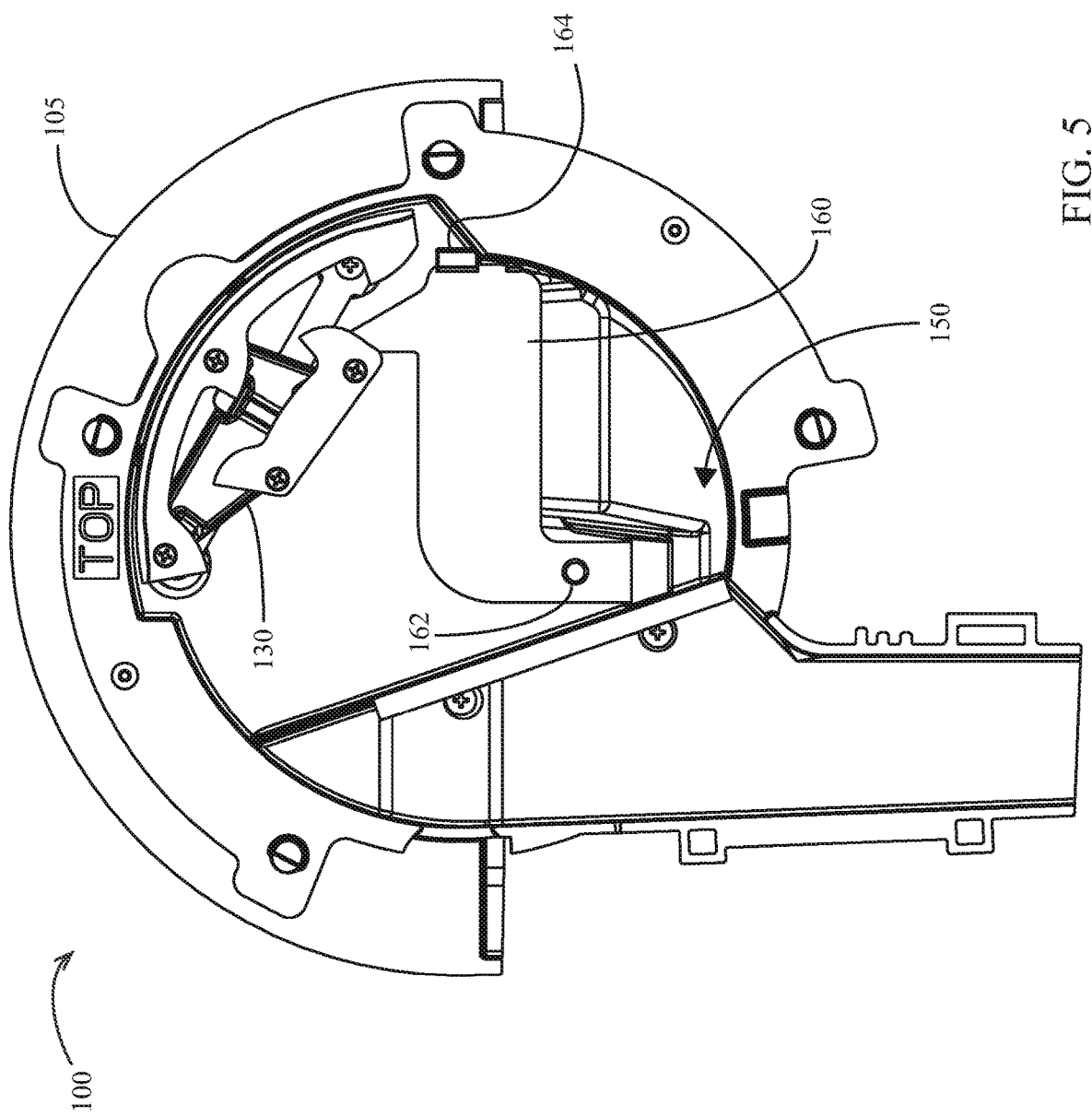
FIG. 5 is a partial side elevation view of an embodiment of a seed meter.

Turning to FIG. 4, the interior of the seed housing 105 is shown with the seed disc 120, drive shaft 183 and drive plate 186 removed. A brush 112 is mounted to seed housing 105 such that its bristles contact the seed-side surface of the seed disc 120. A singulator 130 is mounted to the seed housing 105 (as described further herein) which cooperates with the seed disc 120 to singulate the seeds before they are dispensed through the seed exit 180. The singulator preferably includes multiple singulator surfaces in contact with a seed side surface 140 of the seed disc 140.

Referring to FIGS. 5, 6, and 13A-C, seeds are communicated into the seed meter 100 beneath a baffle 160 mounted to the seed housing 105. A seed pool area 150 (FIG. 5) is disposed horizontally adjacent to the seed disc 120 near a bottom end of the seed housing 105 for collection of seeds communicated into the seed meter.

Figure 9:
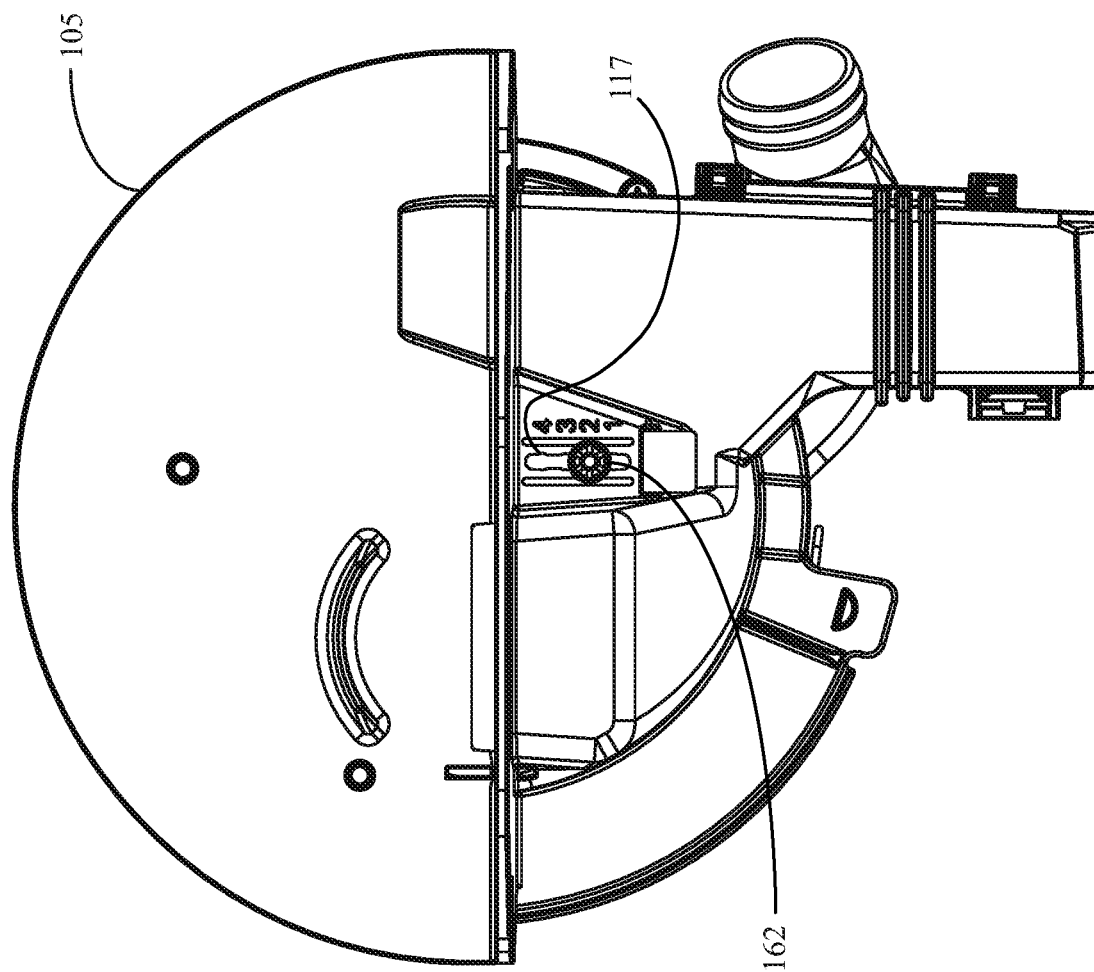
FIG. 9 is another side elevation view of an embodiment of a seed meter.
Figure 13B:
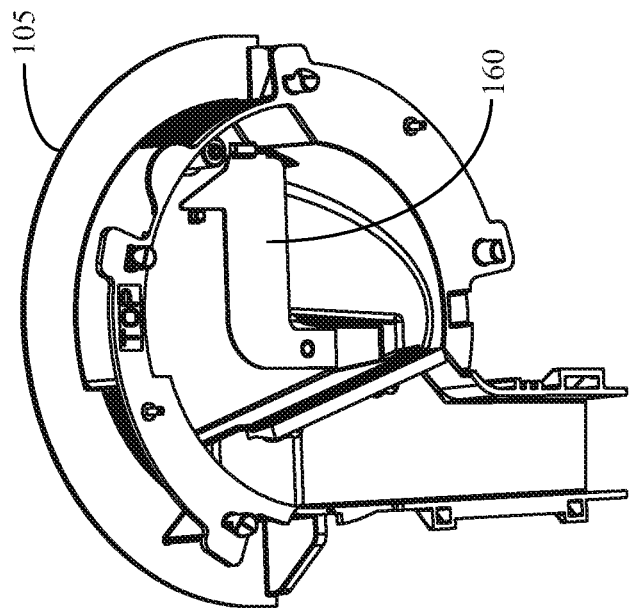
FIG. 13B is another partial perspective view of an embodiment of a seed meter.
Figure 13A:
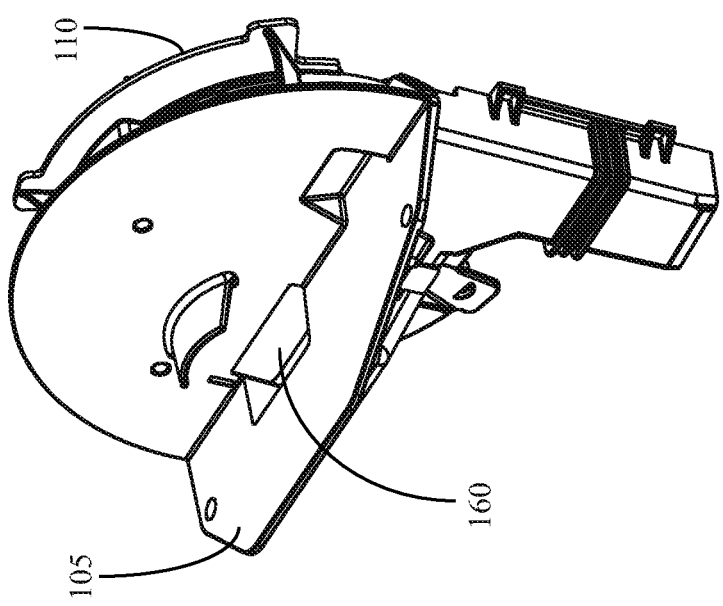
FIG. 13A is another perspective view of an embodiment of a seed meter.
Figure 13C:
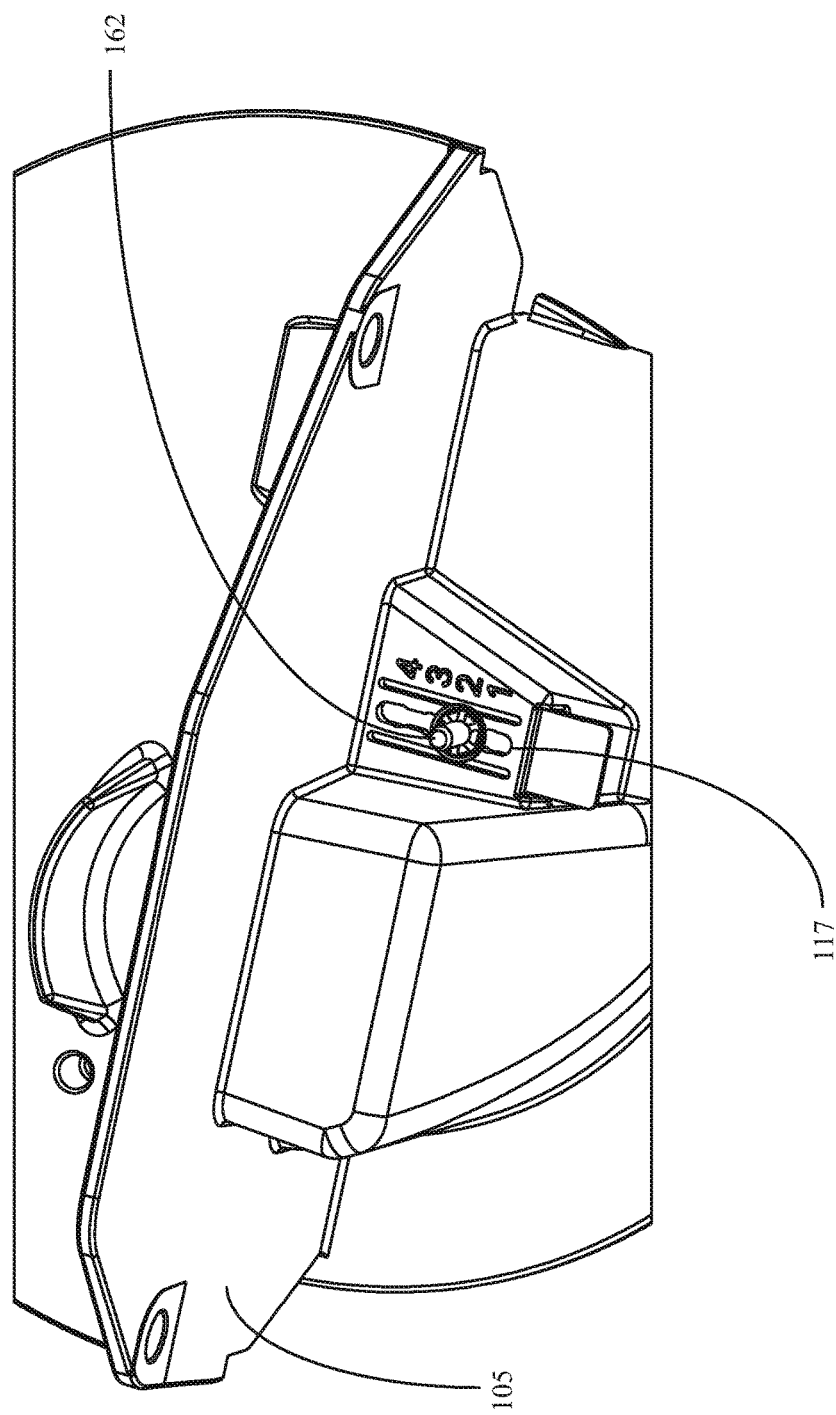
FIG. 13C is a partial perspective view of an embodiment of a seed meter.

The height of baffle 160 may be adjusted along guides 164 and 166. The baffle 160 is mounted to the seed housing 105 by rivet 162, which extends outside the seed housing 105 (as best seen in FIGS. 9 and 13C) and may be moved vertically by the operator along a notched slot 117 without disassembling the housing. Each notch in slot 117 is sized to hold the rivet 162 in place such that the operator can select the height of baffle 160 by pushing the rivet up and down. As illustrated, visual indicators (e.g., numbers 1 through 4) are preferably located adjacent to the notches for positioning the rivet 162 at corresponding heights of the baffle 160 for ease of reference.

Removable Floating Singulator Embodiments

Figure 6:
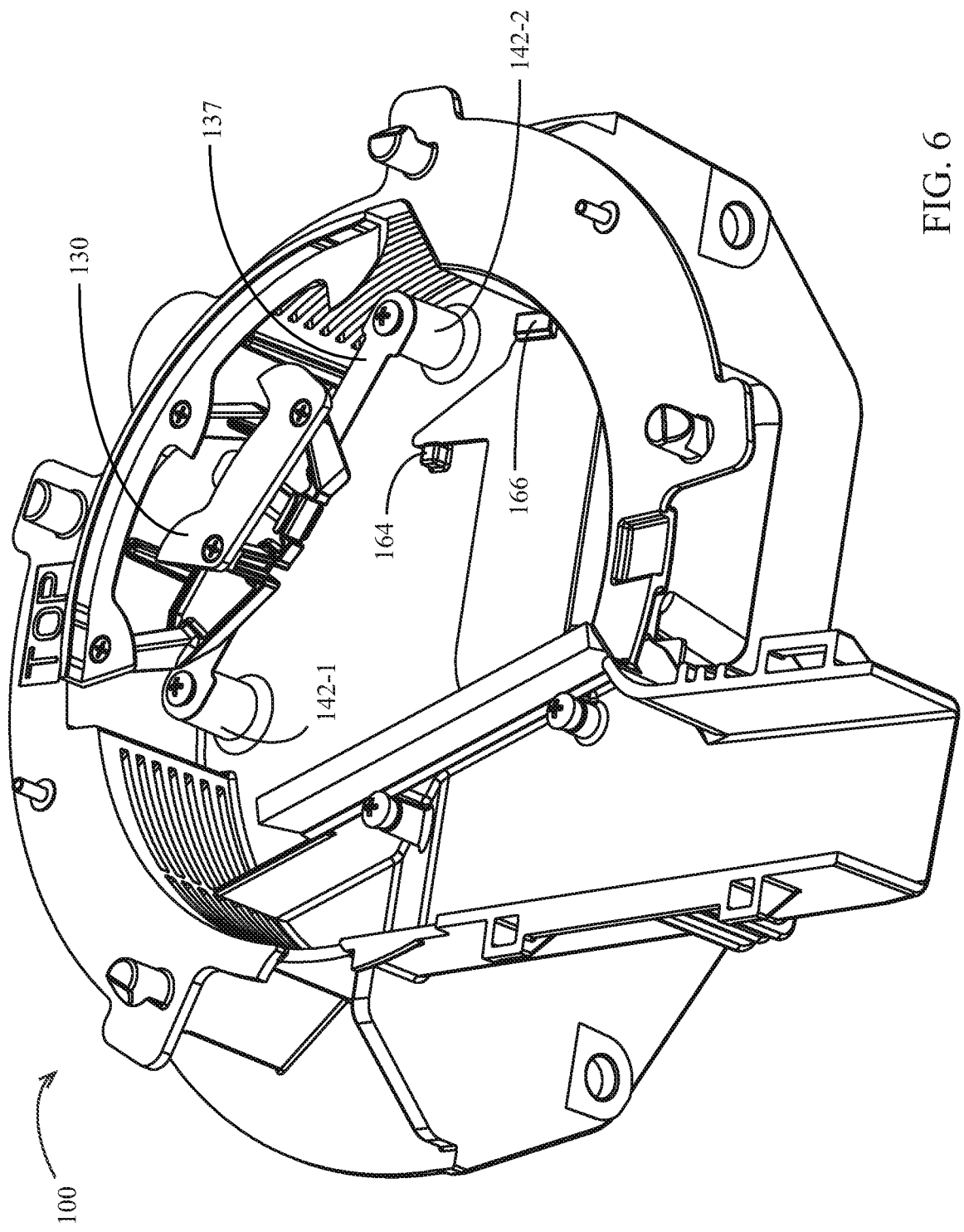
FIG. 6 is another partial perspective view of an embodiment of a seed meter.
Figure 7:
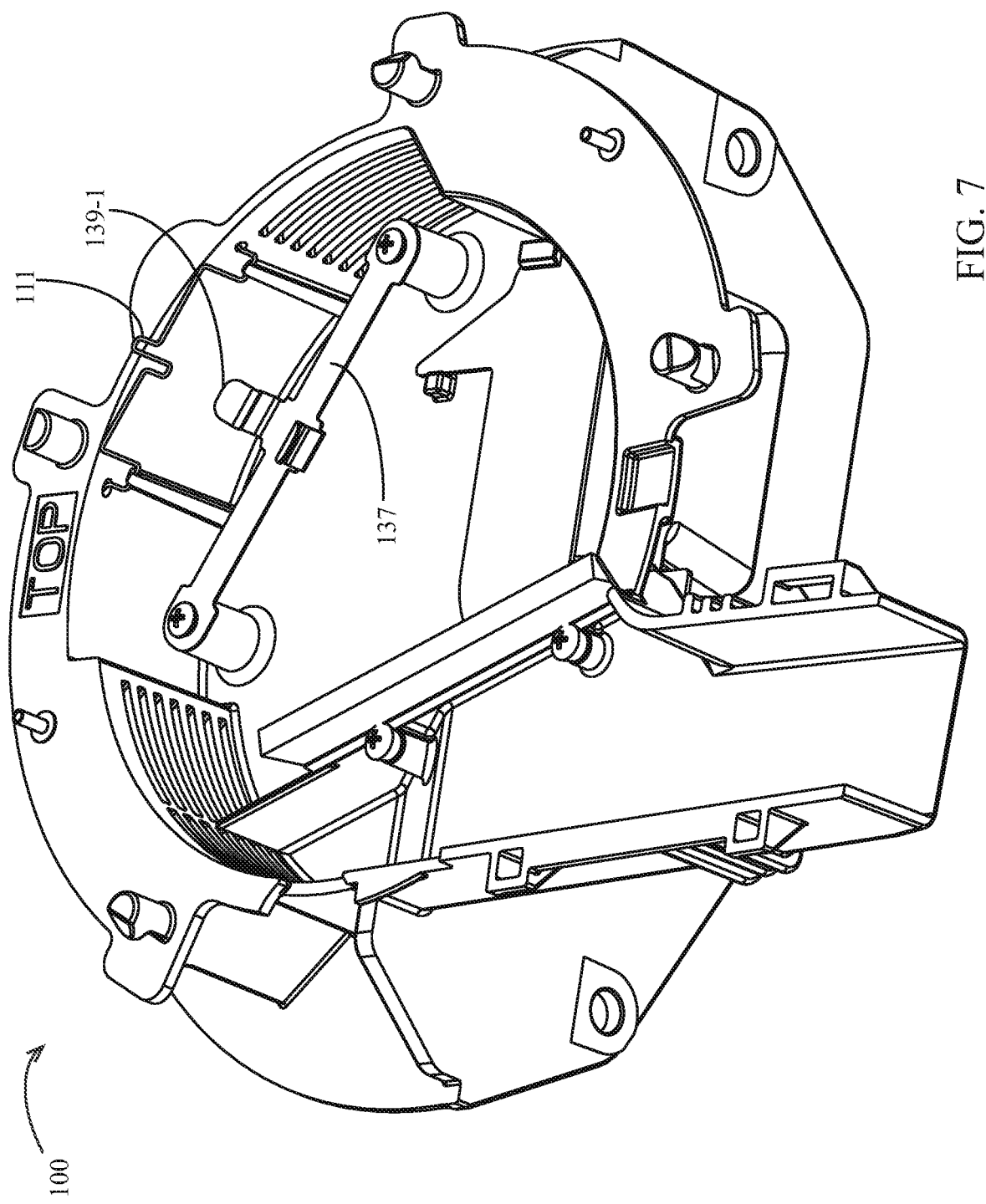
FIG. 7 is another partial perspective view of an embodiment of a seed meter.
Figure 8:
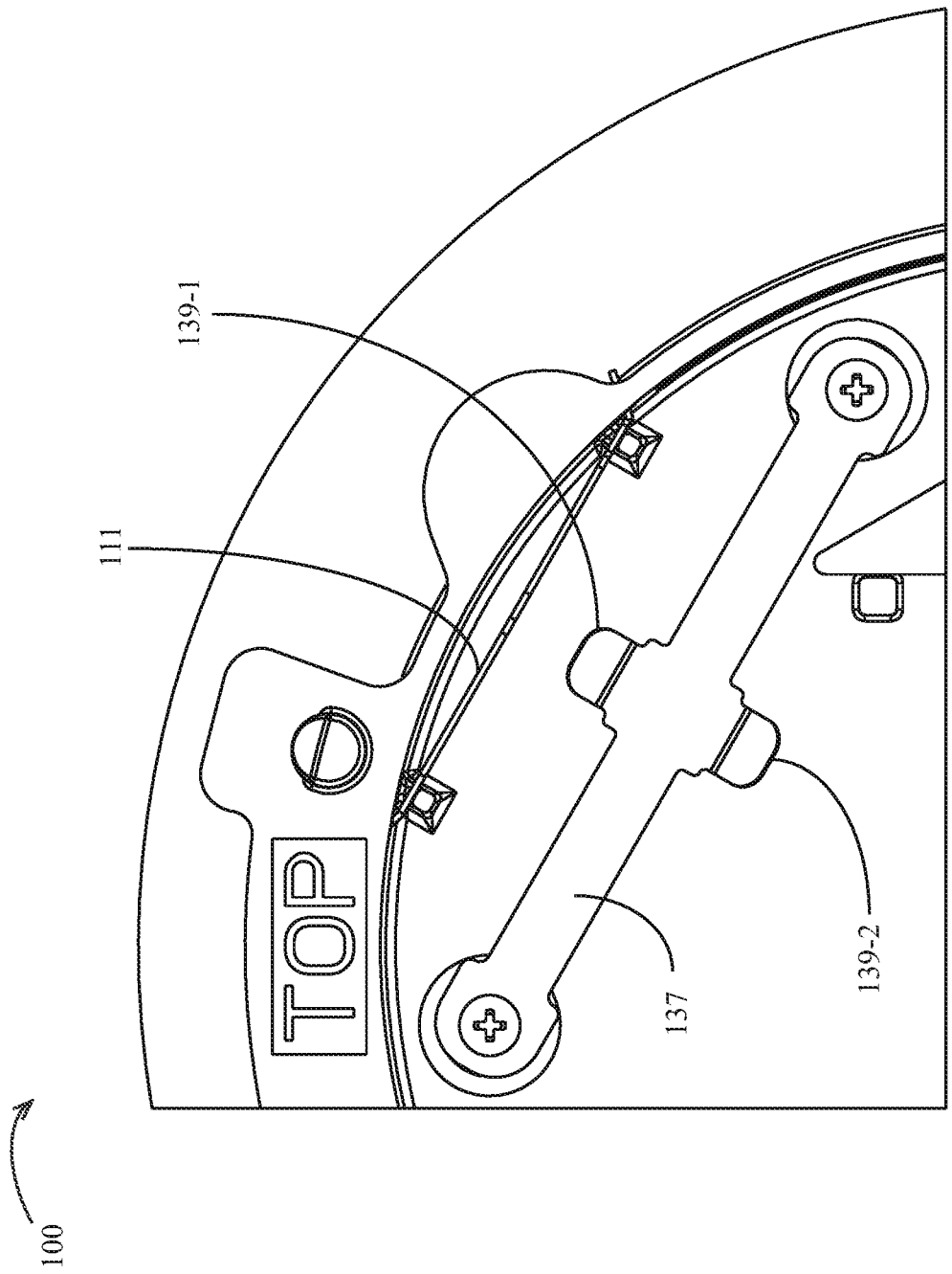
FIG. 8 is another side elevation view of an embodiment of a seed meter.

Referring to FIGS. 6-8, the singulator 130 is releasably mounted to the seed housing 105 so as to bias the singulator against the seed disc 120 while allowing the singulator to "float" both axially and longitudinally with respect to the axis of rotation of the seed disc. The singulator is releasably coupled to an axial spring 137 by attachment ears 139. The axial spring 137 is preferably made of a material (e.g., spring steel) which is elastically deformable. The axial spring 137 is mounted to bosses 142. The bosses 142 are sized such that the singulator 130 is biased against the face of the seed disc 120 when the seed disc is in its normal position. Thus, when the seed disc 120 is deflected axially away from the vacuum cover 110, the tension in axial spring 137 increases, allowing the singulator to remain in contact with the seed disc without interfering with the rotation of the seed disc. Likewise, when the seed disc is deflected axially toward the vacuum cover 110, the tension in axial spring 137 decreases such that the singulator remains in contact with the seed disc.

Radial spring 111 is mounted to the seed housing 105 such that in operation, the radial spring biases the singulator radially against the seed disc 120 when the seed disc is in its normal position.

Referring to FIGS. 12A-D, the singulator 130 is illustrated in detail attached to the axial spring 137. The singulator 130 includes base 133, arms 136, upper lobe plate 134 and lower lobe plate 132. The upper lobe plate 134 includes three singulation lobes, while the lower lobe plate 132 includes two singulation lobes. In operation, attachment ears 139 grasp the base 133. When the axial spring 137 is attached to the singulator 130, the attachment ears 139 extend past and away from the base 133 and are easily manipulated and deflected. It should be appreciated that other configurations of the singulator 130 could be used to achieve the objectives described herein.

It should be appreciated that the singulator 130 is easily replaceable with another singulator with a different lobe configuration for different seeds or if it is necessary to replace the singular due to wear on the singulator lobes. The singulator 130 is removable by pulling it away from the axial spring 137 with sufficient force that the attachment ears 139 deflect away from each other sufficiently to release the base 133. The attachment ears 139 may also be deflected away from each other with one hand while pulling the singulator 130 away from the axial spring 137 with the other. Likewise, the singulator 130 may be replaced by pressing the base 133 of the singulator between the attachment ears 139 with sufficient force to cause the attachment ears to deflect away from each other to allow the base of the singulator to pass between them. To replace the singulator, the base 133 may be pushed between the ears causing them to deflect away from one another before returning to the normal position in which the base of the singulator is again secured between the ears. In this way the singulator 130 may be easily removed and replaced by hand without the use of tools and without removing or changing the location of axial spring 137, which remains in the correct location to bias the singulator 130 against the seed disc 120 while allowing the singulator 130 to "float" with deflections or deformations of the seed disc.

Figure 10:
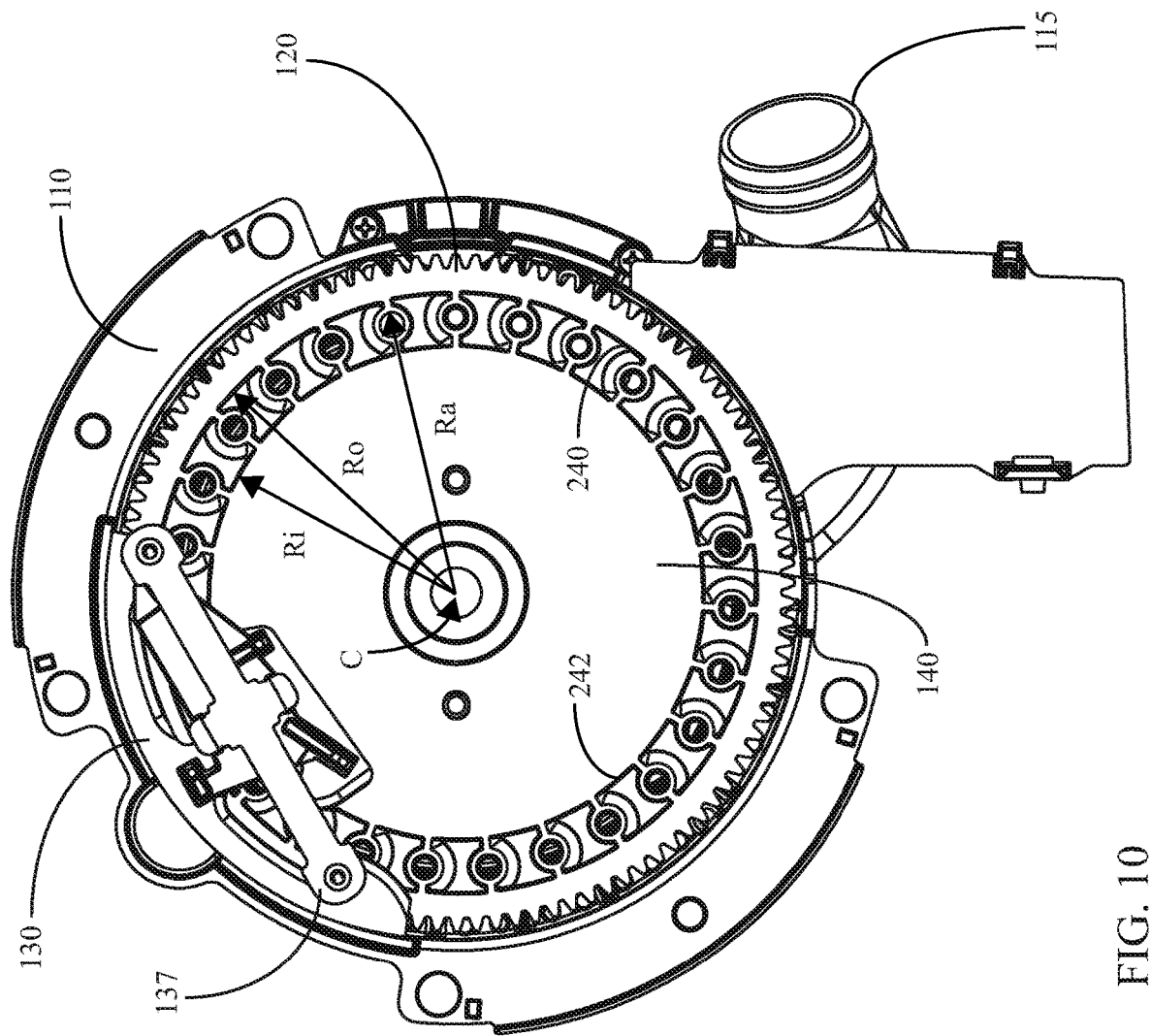
FIG. 10 is a partial side elevation view of an embodiment of a seed meter.
Figure 11:
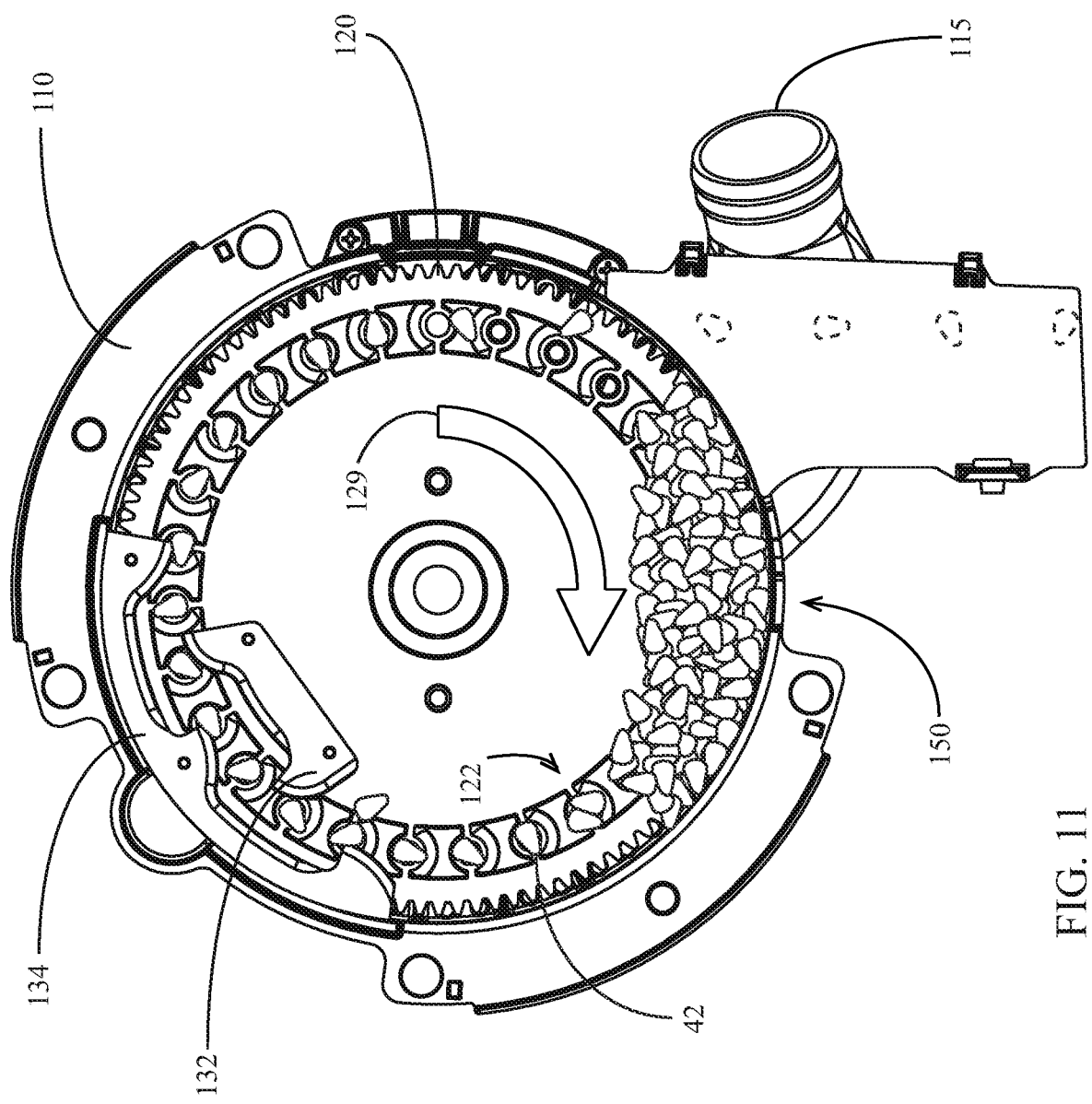
FIG. 11 is a partial side elevation view of an embodiment of a seed meter.

Referring to FIGS. 10 and 11, the seed meter 100 is illustrated with the seed housing 105 and other components removed so that the singulator 130 may be seen in its preferred location biased against the seed-side surface 140 of the seed disc 120. The seed-side surface 140 is preferably normal to the axis of rotation of the seed disc 120. The seed-side surface 140 is also preferably substantially flat with the exception of cavities 128, described in more detail later. For clarity, only the upper and lower lobe plates 132 and 134 are shown in FIG. 11. In operation, the seed disc 120 rotates in the direction indicated by arrow 129 such that the seed apertures 122 travel along a seed aperture path. A portion of the seed aperture path is adjacent to the seed pool area 150. As the seed apertures 122 turn past the seed pool area 150 at the bottom of the seed housing 105, a vacuum side of each seed aperture is placed in fluid communication with the vacuum source such that one or more seeds 42 become entrained over apertures 122. As the seed-bearing apertures rotate between the upper and lower lobe plates 132,134, the lobes of the lobe plates bump, rotate and position the seeds so that only one seed is firmly entrained over the aperture while the other seeds drop back into the seed pool 150, thereby leaving one seed per aperture. After the apertures 122 rotate past the 3 o'clock position as viewed in FIG. 11, the apertures 122 are no longer in communication with the vacuum source resulting in the seeds being released from the apertures and falling into the seed exit 180.

Figure 14:
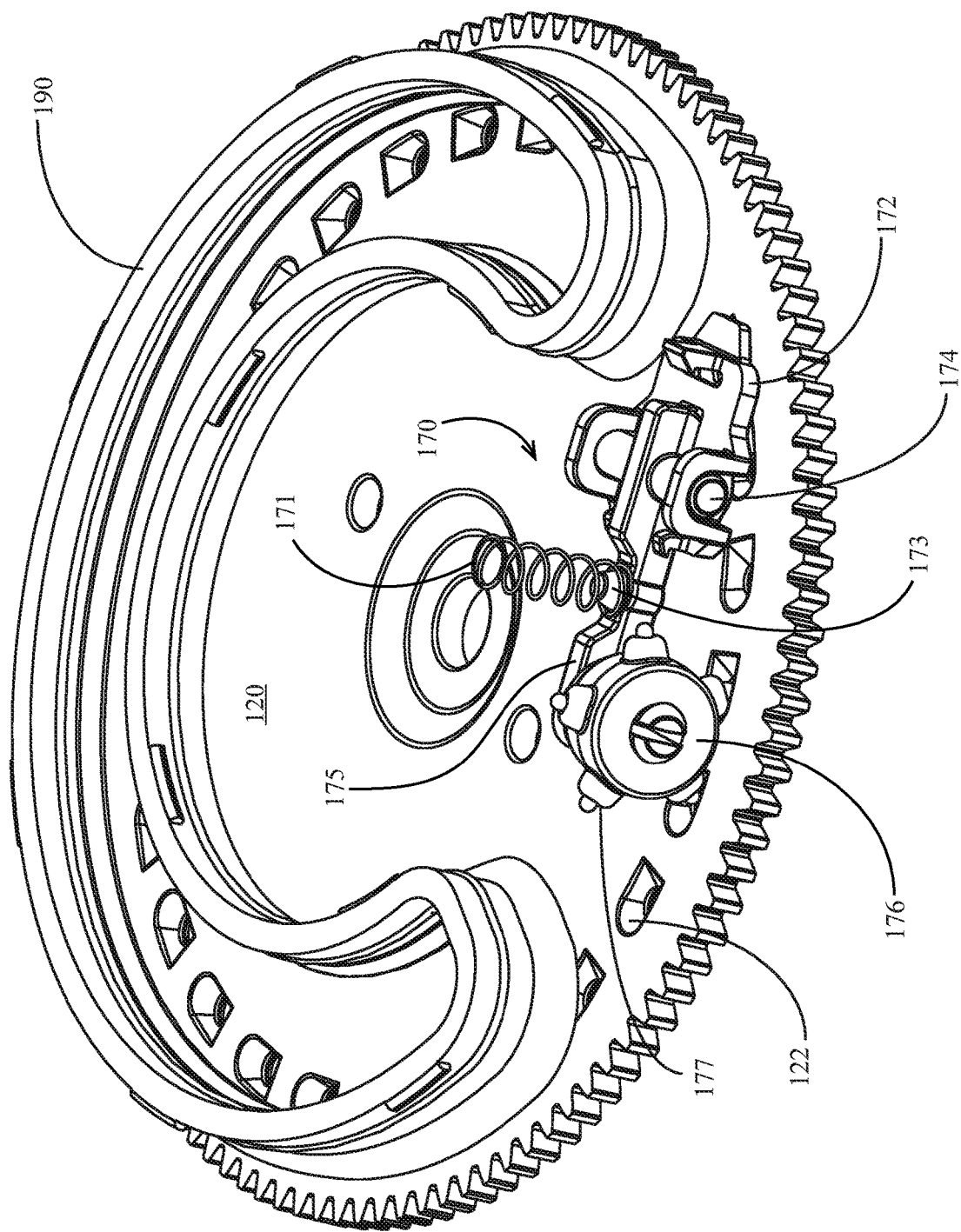
FIG. 14 is a perspective view of a seed disc, vacuum seal and an embodiment of an ejector wheel assembly.
Figure 15:
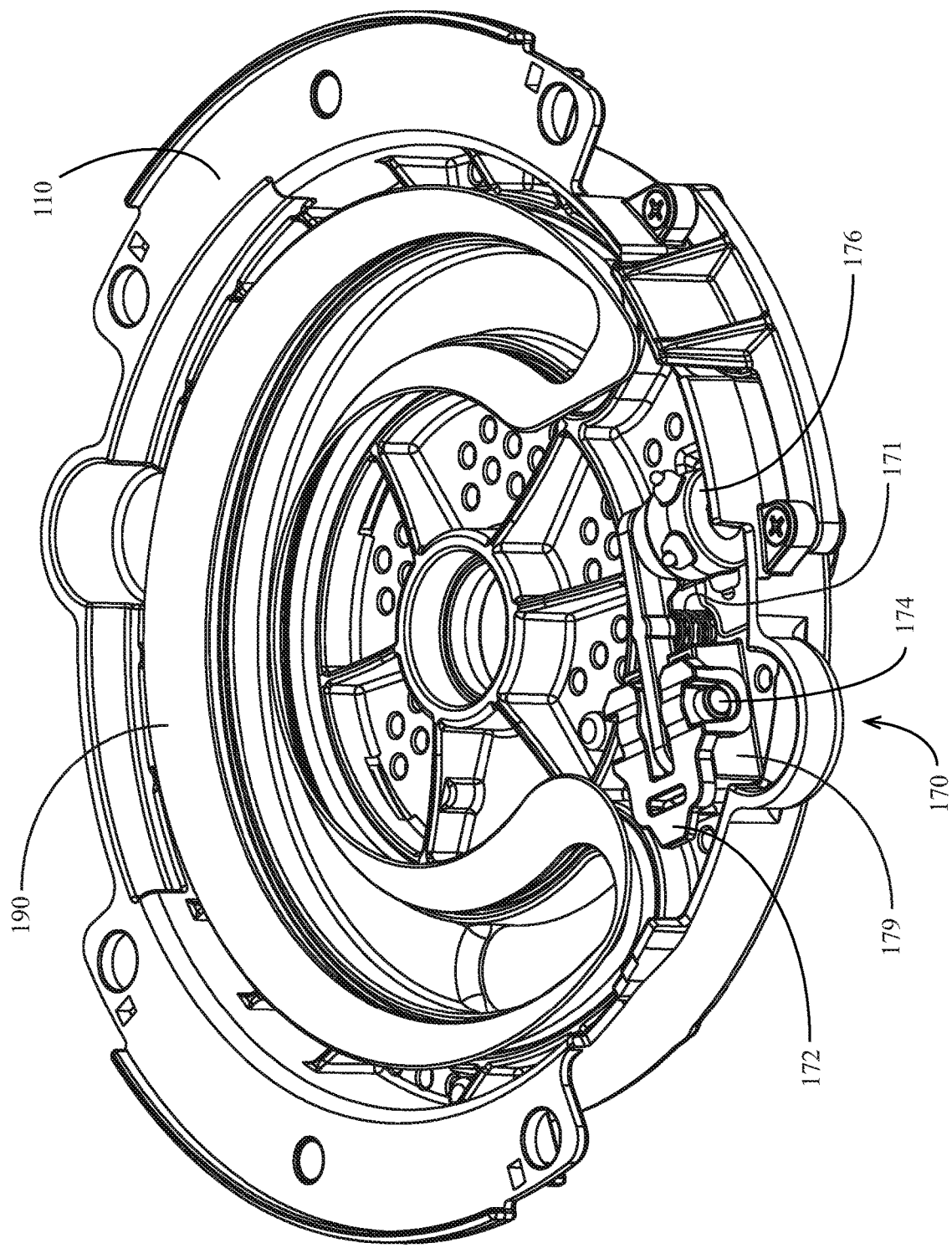
FIG. 15 is a perspective view of a vacuum cover, a vacuum seal, and and an embodiment of an ejector wheel assembly.
Figure 16:
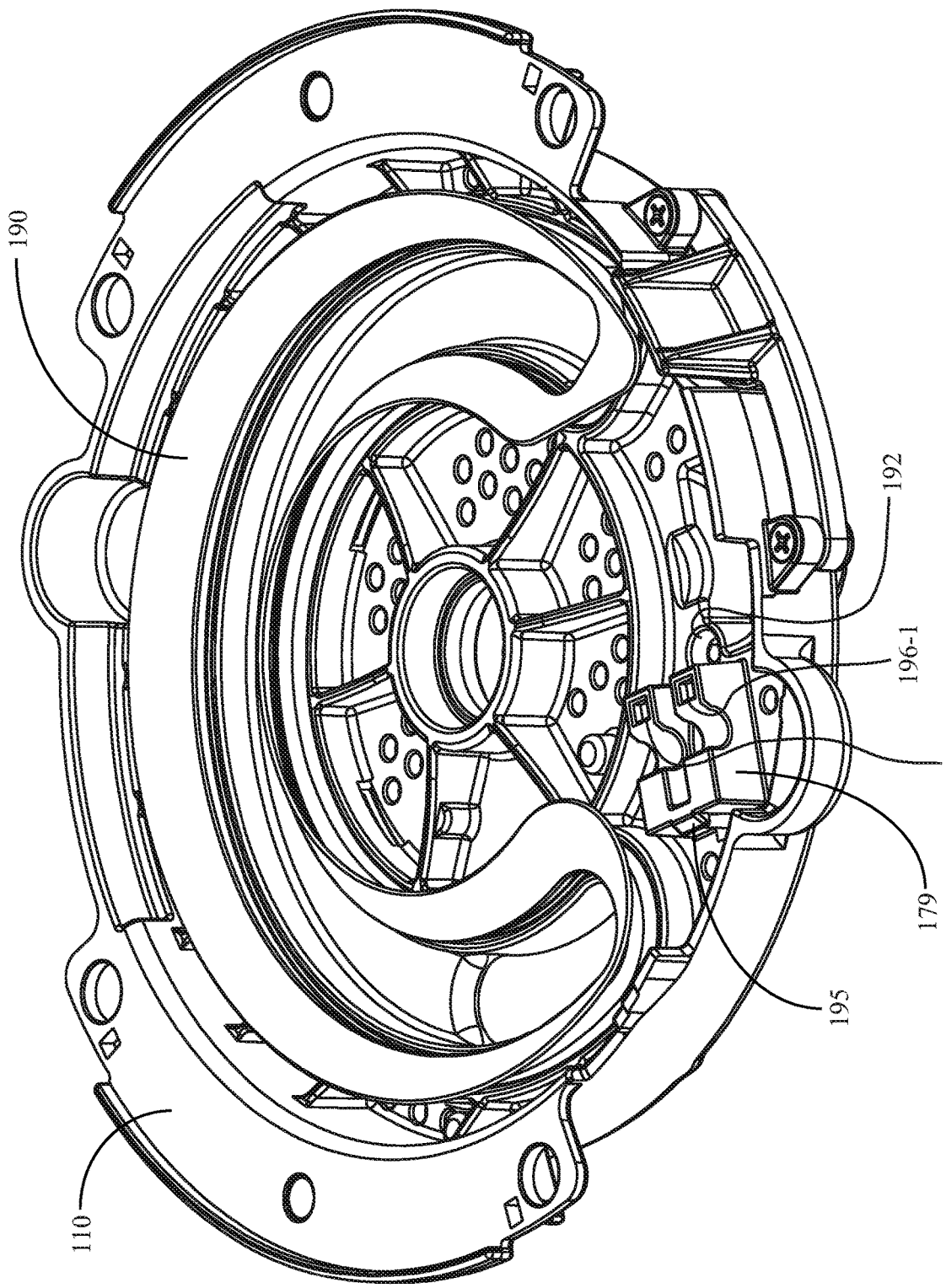
FIG. 16 is a perspective view of a vacuum cover and vacuum seal.

Referring to FIGS. 14-16, the vacuum cover 110 includes a continuous mounting groove into which a vacuum seal 190 is press fit. In operation, the vacuum seal 190 is pressed against the vacuum-side of the seed disc 120 and the interior of the vacuum seal is in communication with the vacuum inlet 115 (FIG. 1) such that as the apertures 122 rotate past the perimeter of the vacuum seal 190 toward its interior they are placed in fluid communication with the vacuum source.

Removable Seed Ejector Assemblies

It has been found that seeds or partial seeds may become lodged in the seed apertures 122 and remain there even after the apertures 122 pass outside of the vacuum seal 190 where no vacuum is imposed. This is undesirable because when the apertures re-enter the seed reservoir an additional seed may not be entrained in an aperture holding a seed or partial seed. Thus, referring again to FIGS. 14-16, a seed ejector assembly 170 is preferably mounted to the vacuum cover 110. The seed ejector assembly 170 includes a shaft 174, a mounting clip 172, a lever arm 175 and an ejector wheel 176 having plungers 177. The ejector wheel 176 is rotatably coupled to the lever arm 175. The lever arm is rotatably coupled to the shaft 174. The shaft is rotatably received within the mounting clip 172. As best seen in FIG. 15, the mounting clip 172 is attached to a mounting port 179, which is preferably formed integrally with the vacuum cover 110. As best seen in FIG. 14, as the seed disc 120 rotates, the ejector wheel 176 rotates and the plungers 177 enter each seed aperture 122, knocking out any seeds, partial seeds or debris in the seed apertures from the back side or vacuum-side of the seed disc 120.

As best illustrated in FIGS. 14 and 15, a spring 171 is preferably disposed between the lever arm 175 and the vacuum cover 110. The spring 171 has a first end held in place at a first end by a knob 173 on the lever arm 175 and has a second end held in place by cavity 192 in the vacuum cover 110. It should be appreciated that the spring 171 biases the ejector wheel 176 against the disc and allows the seed ejector assembly 170 to "float" with deflections or deformations of the seed disc 120.

Figure 17B:
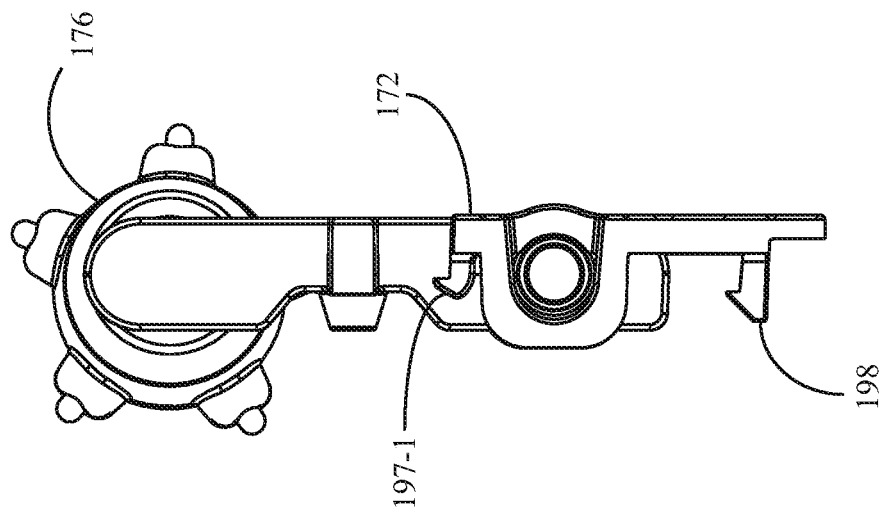
FIG. 17B is a side elevation view of an embodiment of an ejector wheel assembly.
Figure 17A:
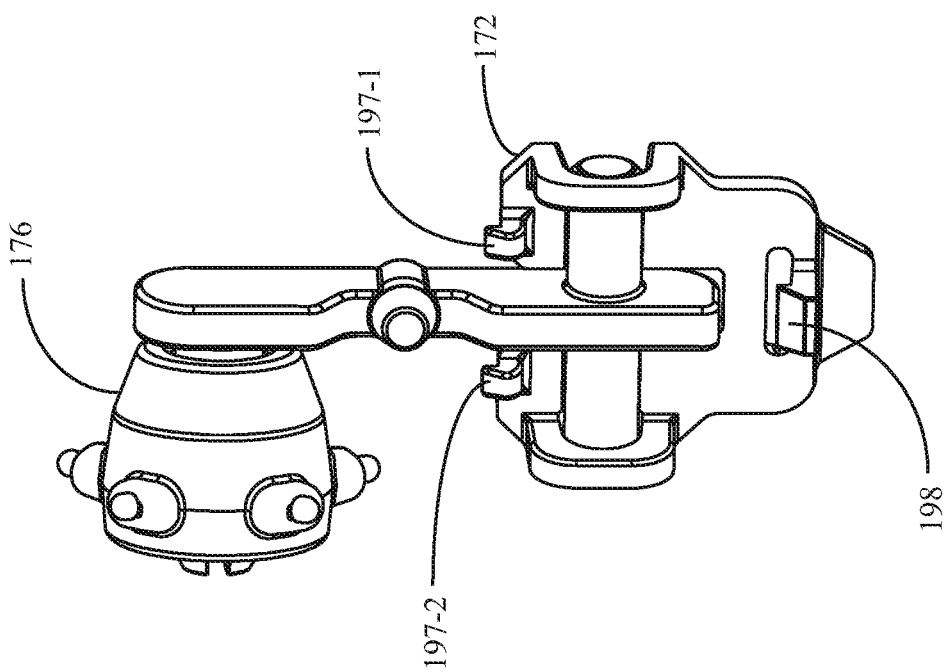
FIG. 17A is a perspective view of an embodiment of an ejector wheel assembly.

It should be appreciated that the user may wish to remove the seed ejector assembly 170 or replace it due to wear on the ejector wheel 176, to install a differently configured seed ejector assembly, or for other reasons. As illustrated in FIGS. 16, 17A and 17B, the mounting clip 172 may be easily removed from and reattached to the mounting port 179 without the use of tools. The mounting port 179 includes apertures 196 and a tab 195. Mounting clip 172 includes rigid hooks 197 and resilient hook 198. During installation, the user first inserts rigid hooks 197 into apertures 196, then preferably presses mounting clip 172 against vacuum cover 110 such that resilient hook 198 deflects around tab 195 and returns to a relaxed state secured around tab 195. It should be appreciated that in addition to deflection of resilient hook 198 with respect to mounting clip 172, the mounting clip 172 also preferably deflects to allow resilient hook 198 to deflect around the tab 195. After attachment, the mounting clip 172 is secured against mounting port 179 until the user removes the mounting clip by bending the mounting clip to release the resilient hook 198 from tab 195 and then moving the rigid hooks 197 free of the apertures 196.

Alternative Ejector Wheel and Disc Embodiments

Turning to FIGS. 18A-18D, a modified seed ejector assembly 270 is illustrated in cooperation with a modified seed disc 220. The seed disc 220 includes an array 224 of apertures 222. The seed disc 220 further includes an array 234 of guide cavities 232. The guide cavity array 234 is preferably substantially concentric with the seed aperture array 224.

Figure 18A:
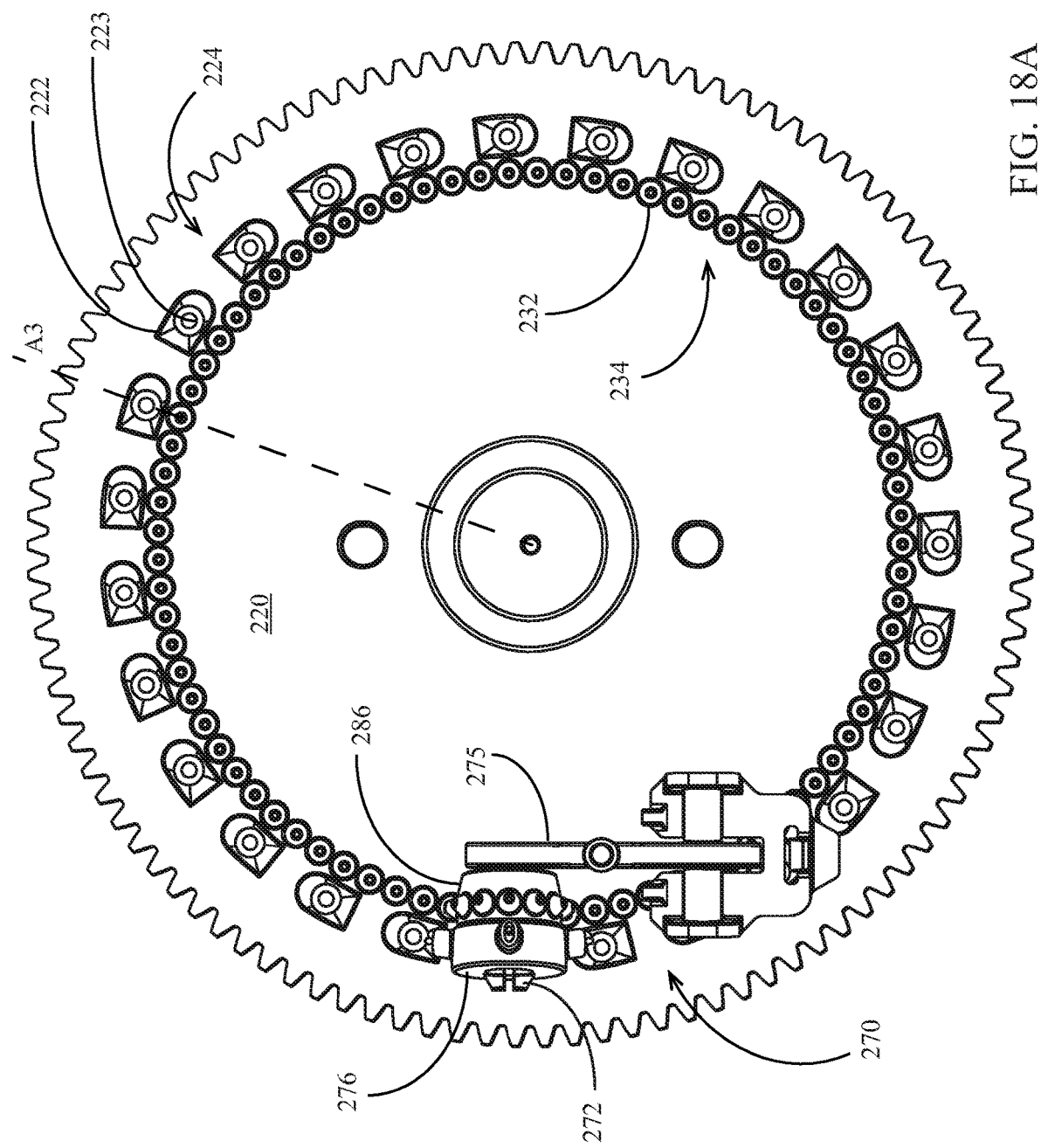
FIG. 18A is a side elevation view of another embodiment of a seed disc and another embodiment of an ejector wheel assembly.
Figure 18B:
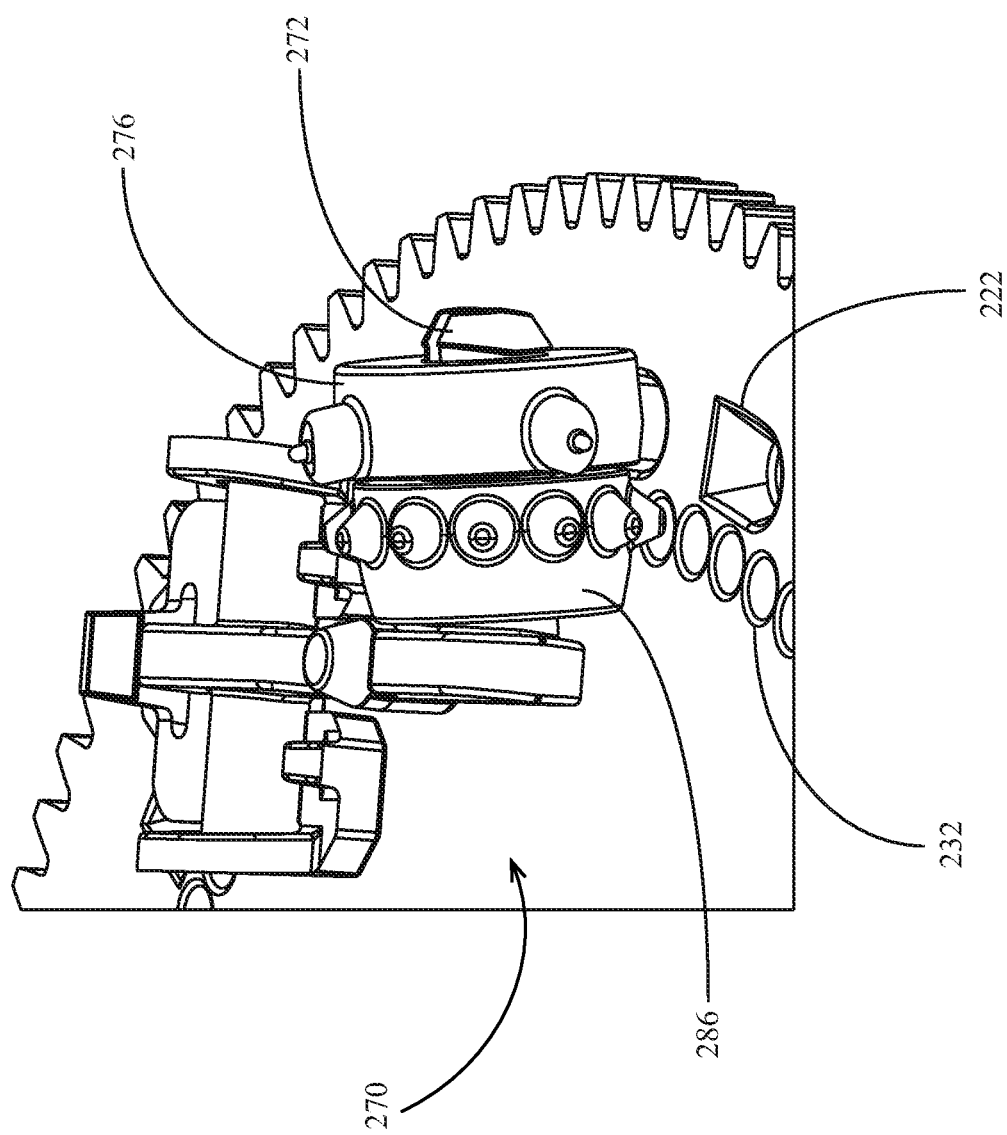
FIG. 18B is a side elevation view of an embodiment of a seed disc and an embodiment of an ejector wheel assembly.
Figure 18D:
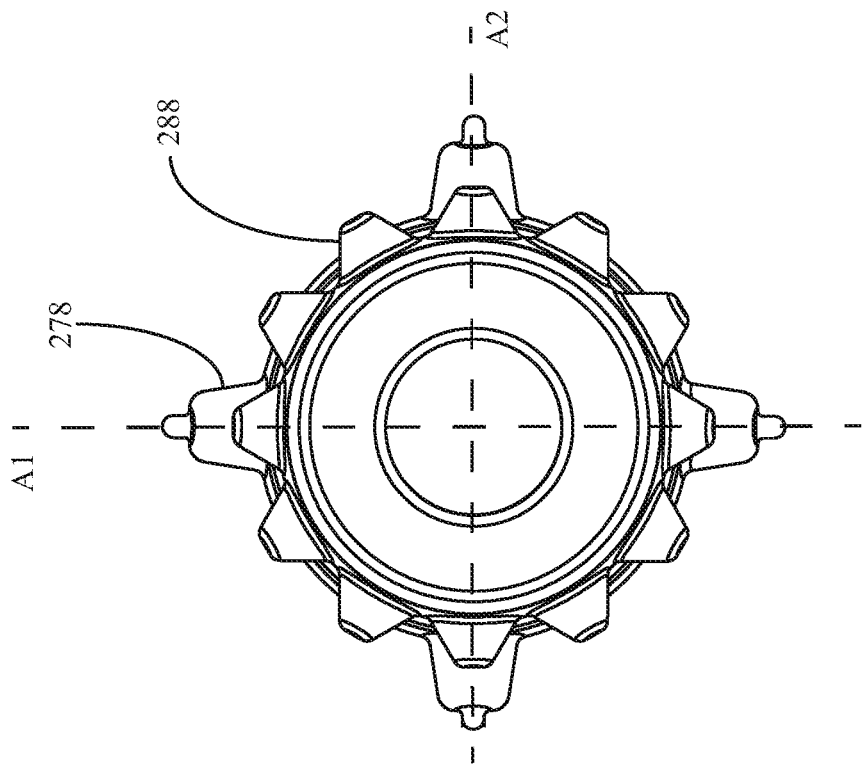
FIG. 18D is a top view of an embodiment of an ejector wheel.
Figure 18C:
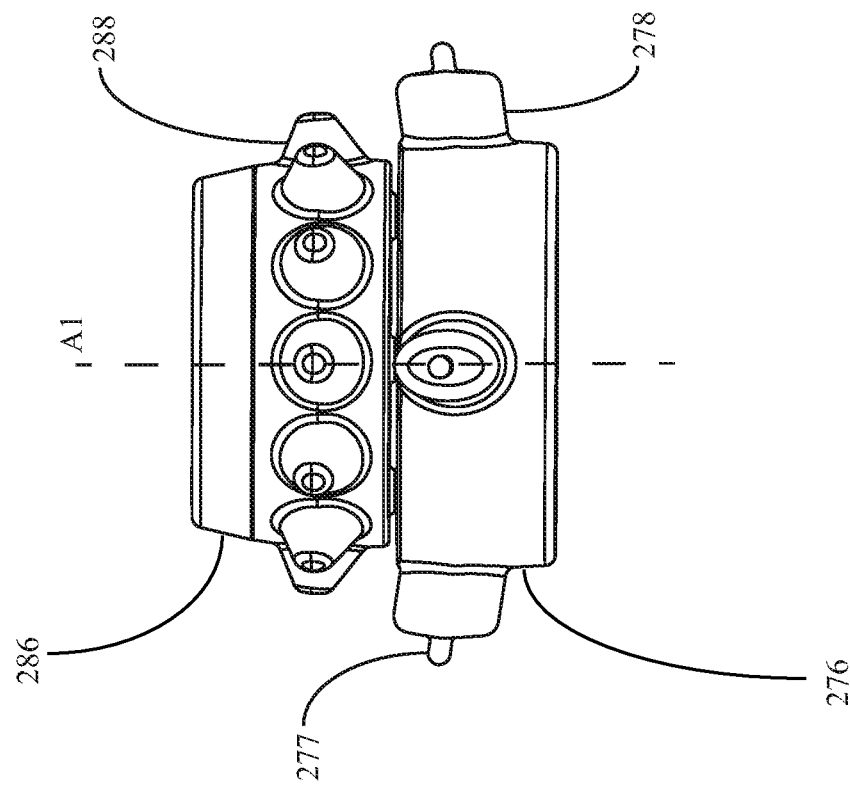
FIG. 18C is a side elevation view of an embodiment of an ejector wheel.

The seed ejector assembly 270 includes a lever arm 275. The lever arm 275 is preferably pivotally biased toward the seed disc 220 as described herein with respect to the lever arm 175. As best illustrated in FIG. 18B, the seed ejector assembly 270 also includes an ejector wheel 276 pivotally mounted to the lever arm 275 and a guide wheel 286 pivotally mounted to the lever arm 275. Continuing to refer to FIG. 18B, the ejector wheel 276 and the guide wheel 286 are preferably pivotally mounted to the lever arm by a retaining pin 272 extending through central apertures in the ejector wheel and guide wheel. The retaining pin 272 preferably allows the ejector wheel 276 and the guide wheel to translate slightly toward and away from the lever arm 275 such that the ejector wheel and guide wheel are allowed to translate radially toward and away from the center of the seed disc 220. As best illustrated in FIGS. 18C and 18D, the ejector wheel 276 includes radially arranged plungers 278 and the guide wheel 286 includes radially arranged guide teeth 288. The seed ejector assembly preferably includes more guide teeth 288 than plungers 278, and preferably includes three guide teeth per plunger. The ejector wheel 276 is preferably fixed to the guide wheel 286 such that the ejector wheel is constrained to rotate synchronously with the guide wheel. Each plunger 278 is preferably aligned with one of the guide teeth 288. For example, as shown in FIG. 18D, the upper and lower plungers 278 are aligned with upper and lower guide teeth along a plane A1 and the left and right plungers 278 are aligned with left and right guide teeth along a plane A2.

In some embodiments of the ejector wheel 276, the plungers 278 include tips 277. In some embodiments of the seed disc 220, the apertures 222 are tapered to small openings 223 (FIG. 18A). The tips 277 are preferably sized to fit within the small openings 223. It should be appreciated that in such embodiments, more precise alignment of the ejector wheel 276 with respect to the seed disc 220 is necessary in order to knock seeds or debris from the small openings 223 without interference between the ejector wheel and seed disc.

In operation, as the disc rotates, the guide teeth 288 sequentially engage the guide cavities 232. The plungers 278 sequentially engage the seed apertures 222. Referring to FIG. 18A, the guide cavity array 234 is aligned with the seed aperture array 224 such that each seed aperture 222 is aligned with a guide cavity 232 along a plane (e.g., plane A3) intersecting the center of the seed disc 220. It should be appreciated that guide teeth 288 engage guide cavities 232 when the plungers 278 are not engaging the seed apertures 222, thus moving the ejector wheel 286 to the proper angular position to successfully engage each seed aperture. Additionally, it should be appreciated that as the ejector wheel translates with respect to the retaining pin 272, the guide teeth 232 likewise retain the ejector wheel 286 at the proper radial distance from the center of the seed disc 220 such that the ejector wheel can successfully engage each seed aperture 222.

Seed Disc Cavities

Figure 19A:
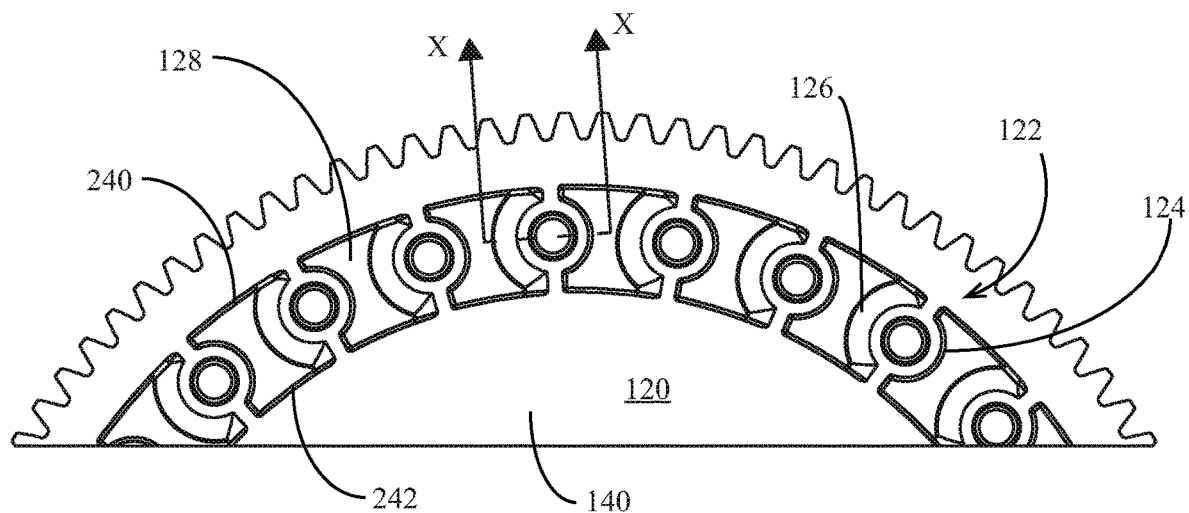
FIG. 19A is a partial side elevation view of an embodiment of seed disc.
Figure 19B:
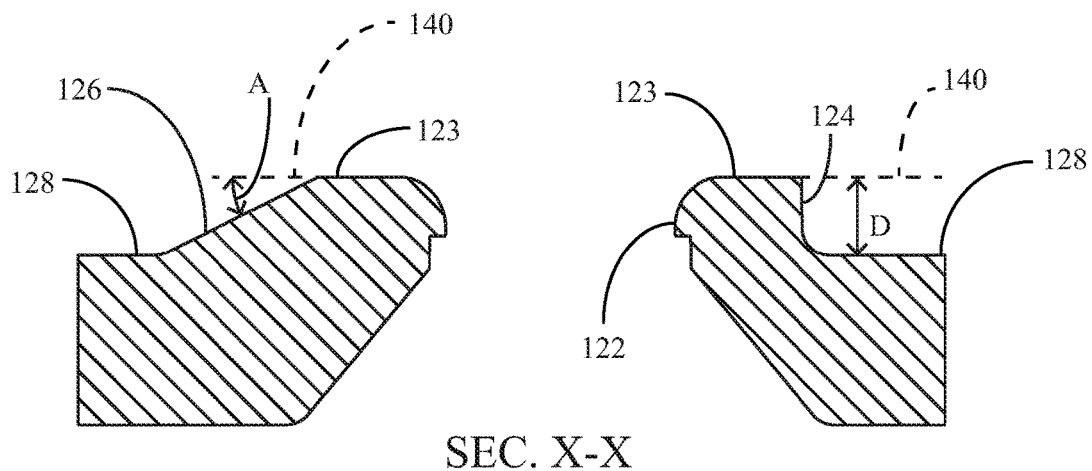
FIG. 19B is a cross-sectional view of a seed disc along the section 19B-19B of FIG. 19A.
Figure 19C:
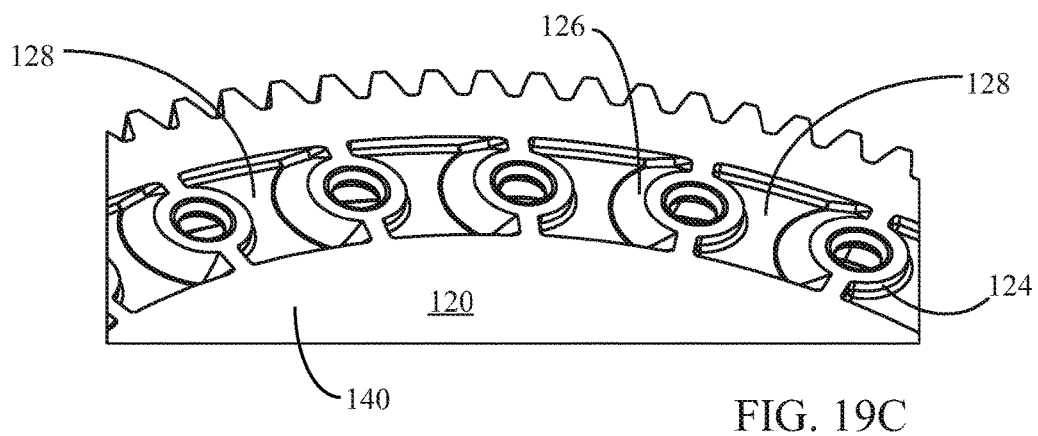
FIG. 19C is a partial perspective view of an embodiment of a seed disc.
Figure 20D:
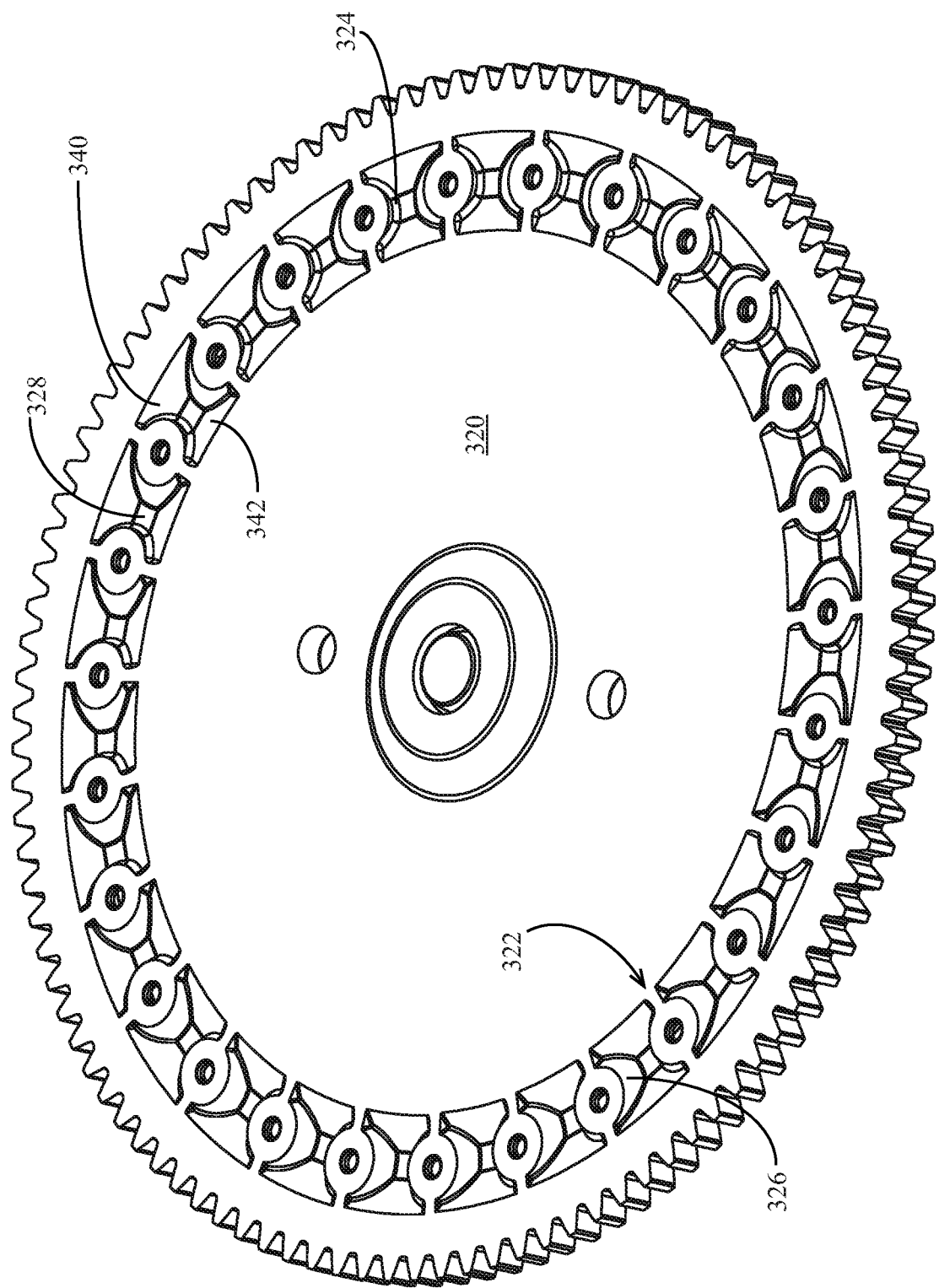
FIG. 20D is a perspective view of an embodiment of a seed disc.

Referring to FIGS. 19A-19C, the seed disc 120 preferably includes seed disc cavities 128 disposed near the radial edge of the seed disc. The cavities 128 are preferably disposed to pass adjacent to the seed pool area 150. Each cavity 128 is preferably disposed forward of an adjacent seed aperture 122 along the direction of travel of the seed aperture path. The cavities 128 are preferably disposed between each pair of seed apertures 122. Seed apertures 122 are preferably substantially normal to the surface 140 of the seed disc 120; i.e., a central axis of each seed aperture 122 is preferably substantially normal to the surface 140 of the seed disc 120. Raised surfaces 123 with respect to the bottom of the associated cavity 128 are preferably disposed between each aperture 122 and the adjacent cavity 128. The upper surface of the raised surfaces 123 are preferably co-planar with the surface 140 of the seed disc 120.

Each cavity 128 preferably comprises an agitation cavity sized to agitate the seeds in the seed pool area 150. Thus the cavities 128 are preferably sized to allow significant movement of seeds 42 into and out of the cavities as each cavity moves adjacent to the seed pool 150. The outer perimeter of the cavity 128 is preferably larger than the outer perimeter of the adjacent seed aperture 122. The area of an intersection between the surface 140 of the seed disc 120 and each cavity 128 is preferably greater than the area of an intersection between the surface 140 and each seed aperture 122. It should be appreciated that each seed aperture is sized to allow limited movement of seeds 42 into the seed aperture. Moreover, the cavities 128 are preferably wider than the average size of seeds 42 to be planted using the seed disc 120. Moreover, the depth D (FIG. 19B) of the cavities 128 is preferably greater than 0.05 inches.

Referring to FIG. 10 in combination with FIG. 19, each cavity 128 preferably has an inner sidewall 242 and an outer sidewall 240 located at distances Ri, Ro respectively from the center C (i.e., the central or rotational axis) of the disc. The difference between the radii Ro and Ri is preferably greater than the diameter of the seed apertures 122. The radius Ro is preferably larger than the distance between the seed aperture and the center of the seed disc 120. The radius Ro is preferably larger than the radius Ra between a distal end of said seed aperture 122 and the center of the disc 120.

In operation, as the seed disc 120 rotates through the seed pool area 150 located to the side of the seed disc (as best illustrated in FIG. 11), seeds move in and out of the cavities 128 such that the seed pool is stirred or agitated. This agitation improves the successful loading of seeds on the seed apertures 122, particularly at relatively high planting speeds which correspond to faster seed disc rotation speeds.

Each cavity 128 preferably includes a sidewall 124 oriented to face the seed pool area 150 as the cavity rotates into the seed pool area. The sidewall 124 is preferably substantially vertical (FIG. 19B), i.e., substantially normal to the surface 140 of the seed disc 120. As viewed along the rotational axis of the seed disc (FIG. 19A), the sidewall 124 is preferably curved, and preferably is semicircular. In operation, the sidewalls 124 sequentially enter the seed pool area 150 and push the seeds such that the seed pool is stirred and agitated.

The cavities 128 preferably include a bevel 126 oriented to face away from the seed pool as the disc 120 rotates into the seed pool area 150. An angle A (FIG. 19B) between bevel 126 and the surface 140 of the seed disc 120 is preferably between 15 and 35 degrees with respect to the surface of the disc. In operation, when seeds are released from the disc (at approximately the 3 o'clock position on the view of FIG. 11), seeds occasionally fall toward the disc and into the cavity 128 located below the seed aperture 122. In such instances, the seed bounces or slides against the bevel 126, smoothly transitioning the seed back out of the cavity 128 and increasing consistency between seed fall times.

Although a seed disc 120 is disclosed herein including series of seed apertures 122 and cavities 128 having the same radial distance from the center of the seed disc, other embodiments include rows of seed cavities Referring to FIGS. 20A-20D, an alternative seed disc 320 is illustrated having cavities 328 disposed between seed apertures 322. Each cavity 328 preferably includes vertical sidewalls 324 and bevels 326. Each cavity 328 preferably includes a beveled inner sidewall 342 and a beveled outer sidewall 340. The beveled sidewalls 342, 340 reduce the interior volume of the cavity 328 and allow seeds to smoothly transition out of the cavity 328 while the seeds are being agitated in the seed pool area 150. Thus each beveled sidewall 342, 340 discourages entrapment of seeds in the cavities 328, particularly smaller seed varieties.

Singulator-Disc Cooperation

As described earlier herein, the singulator 130 is preferably resiliently biased against the seed disc such that the singulator floats radially and axially with the disc. The benefits of radial and axial float are described in more detail in U.S. Pat. No. 7,699,009 ("the '009 patent"), the disclosure of which is hereby incorporated herein in its entirety by reference.

The singulator 130 preferably rides smoothly along the perimeter of the seed disc as the seed disc rotates. In embodiments such as those disclosed in the '009 patent in which the singulator floats against a smooth radial surface (outer cylindrical sidewall 528 in the '009 patent), the singulator may simply include an interior surface having approximately the same radius as the outer radial surface of the disc (e.g., the outer edge of the disc). However, it should be appreciated that such a design may be ineffective in embodiments in which the seed disc includes drive teeth 121 along the perimeter; e.g., the singulator may "chatter" due to contact with the drive teeth. Thus the singulator 130 preferably includes one or more features allowing the seed disc to cooperate effectively with the singulator with minimal chatter.

Figure 12A:
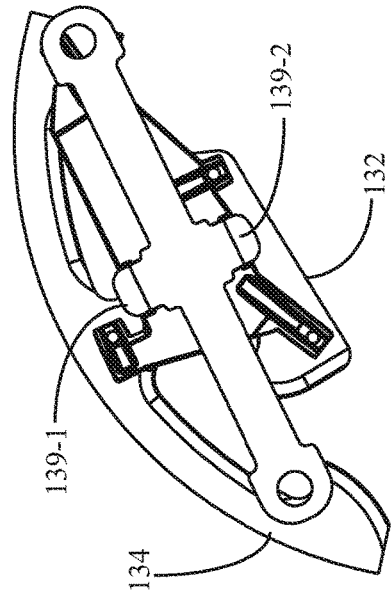
FIG. 12A is a perspective view of an embodiment of a seed singulator and an embodiment of an axial spring.
Figure 12B:
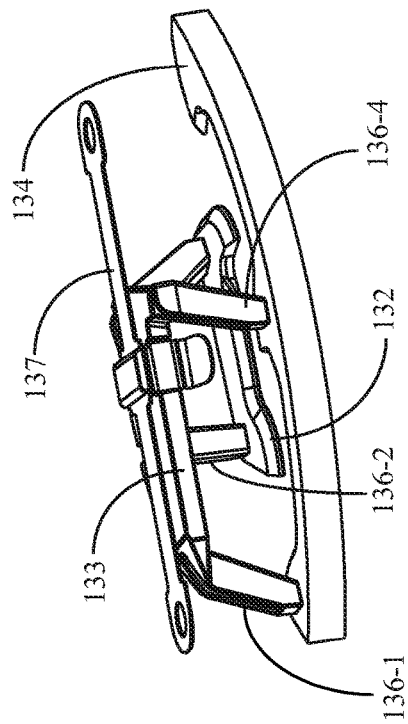
FIG. 12B is another perspective view of an embodiment of a seed singulator and an embodiment of an axial spring.
Figure 12C:
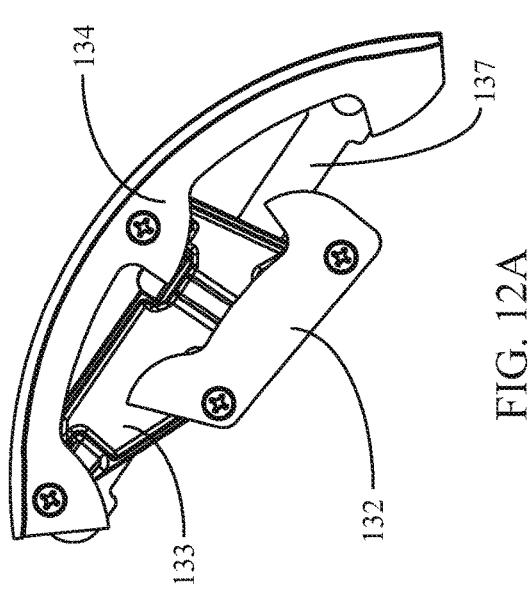
FIG. 12C is another perspective view of an embodiment of a seed singulator and an embodiment of an axial spring.
Figure 12D:
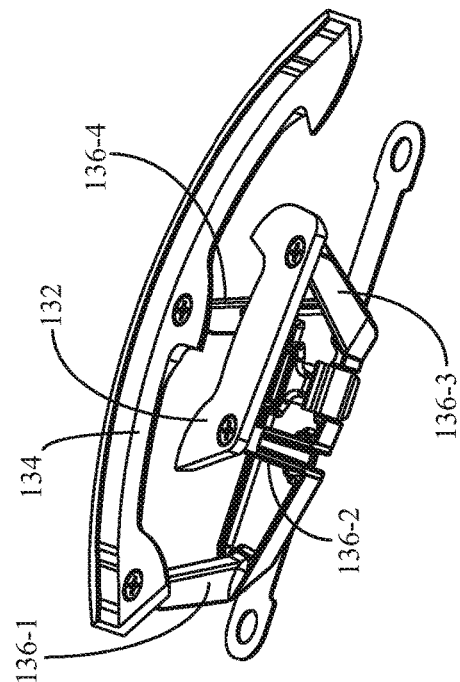
FIG. 12D is another perspective view of an embodiment of a seed singulator and an embodiment of an axial spring.
Figure 24:
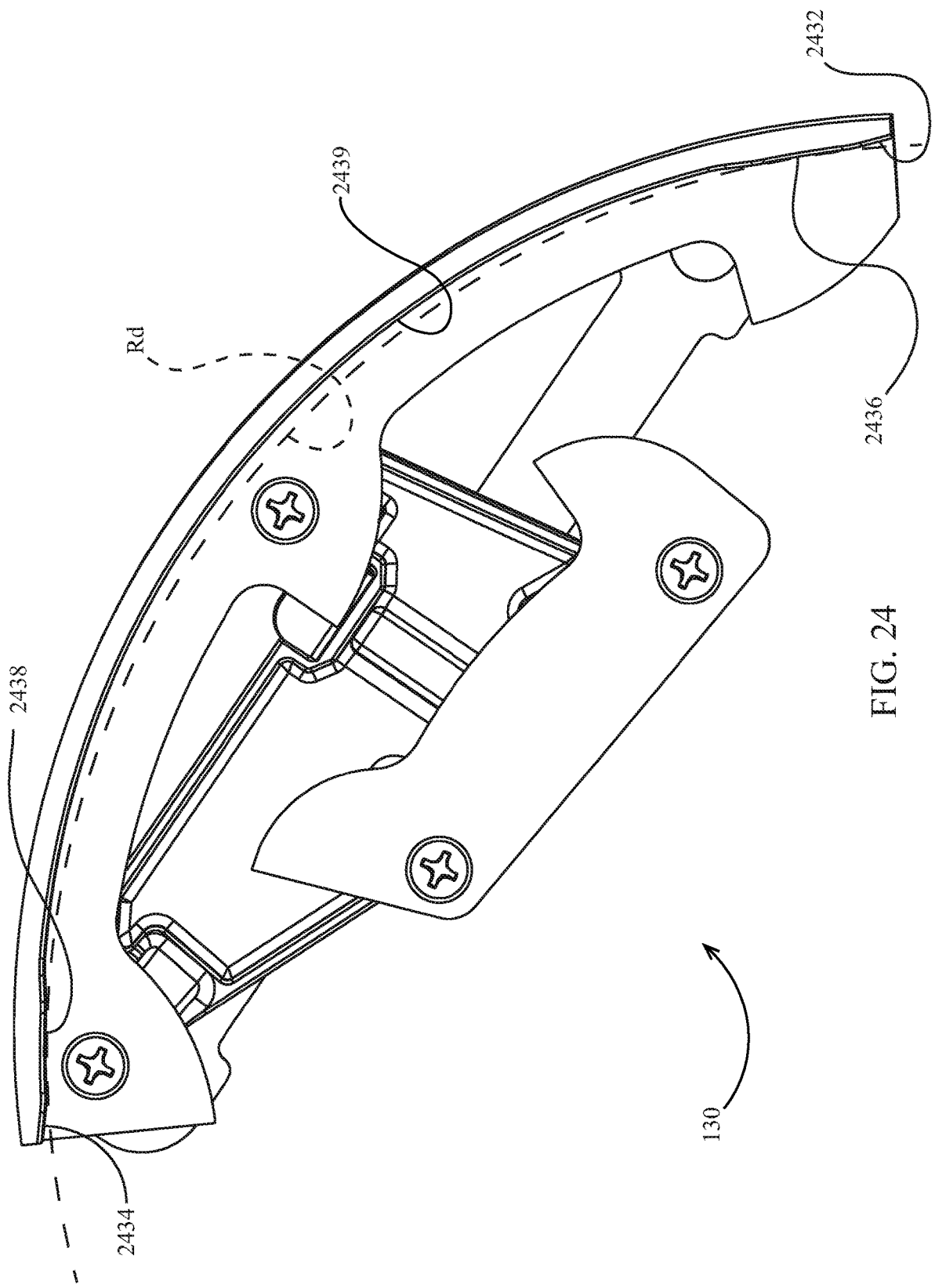
FIG. 24 is an enlarged view of the seed singulator of FIG. 12B.

The view of the singulator 130 illustrated in FIG. 12A is enlarged in FIG. 24 to better illustrate seed disc cooperation features already shown in FIG. 12A. The outer radius Rd of the seed disc (e.g., the outer circumference of the drive teeth 121) is also illustrated in FIG. 24 superimposed on the singulator 130.

Continuing to refer to FIG. 24, the singulator 130 preferably includes a leading chamfer 2432 configured to smoothly guide successive guide teeth 121 into contact with the singulator 130. The singulator 130 also preferably includes a trailing chamfer 2434 configured to smoothly release successive guide teeth 121 from contact with the singulator 130.

The singulator preferably includes a leading surface 2436 and a trailing surface 2438, each having approximately the same radius Rd as the external perimeter of the disc such that the surfaces 2436, 2438 ride on the radially outermost surfaces of the drive teeth 121. The surfaces 2436, 2438 are preferably concentric. The surfaces 2436, 2438 are each preferably annular surfaces and are preferably sized such that between one and three drive teeth 121 contact each of the surfaces during operation. A central surface 2439 disposed between the surfaces 2436, 2438 preferably has a radius smaller than Rd and preferably does not contact the drive teeth 121 during operation.

The leading chamfer 2432 is preferably adjacent to the leading surface 2436 and is preferably configured to smoothly guide successive drive teeth 121 into contact with the leading surface 2436. The trailing chamfer 2434 is preferably adjacent to the trailing surface 2438 and is preferably configured to smoothly release successive drive teeth 121 from contact with the trailing surface 2438.

Alternative Seed Disc Embodiments

Figure 21:
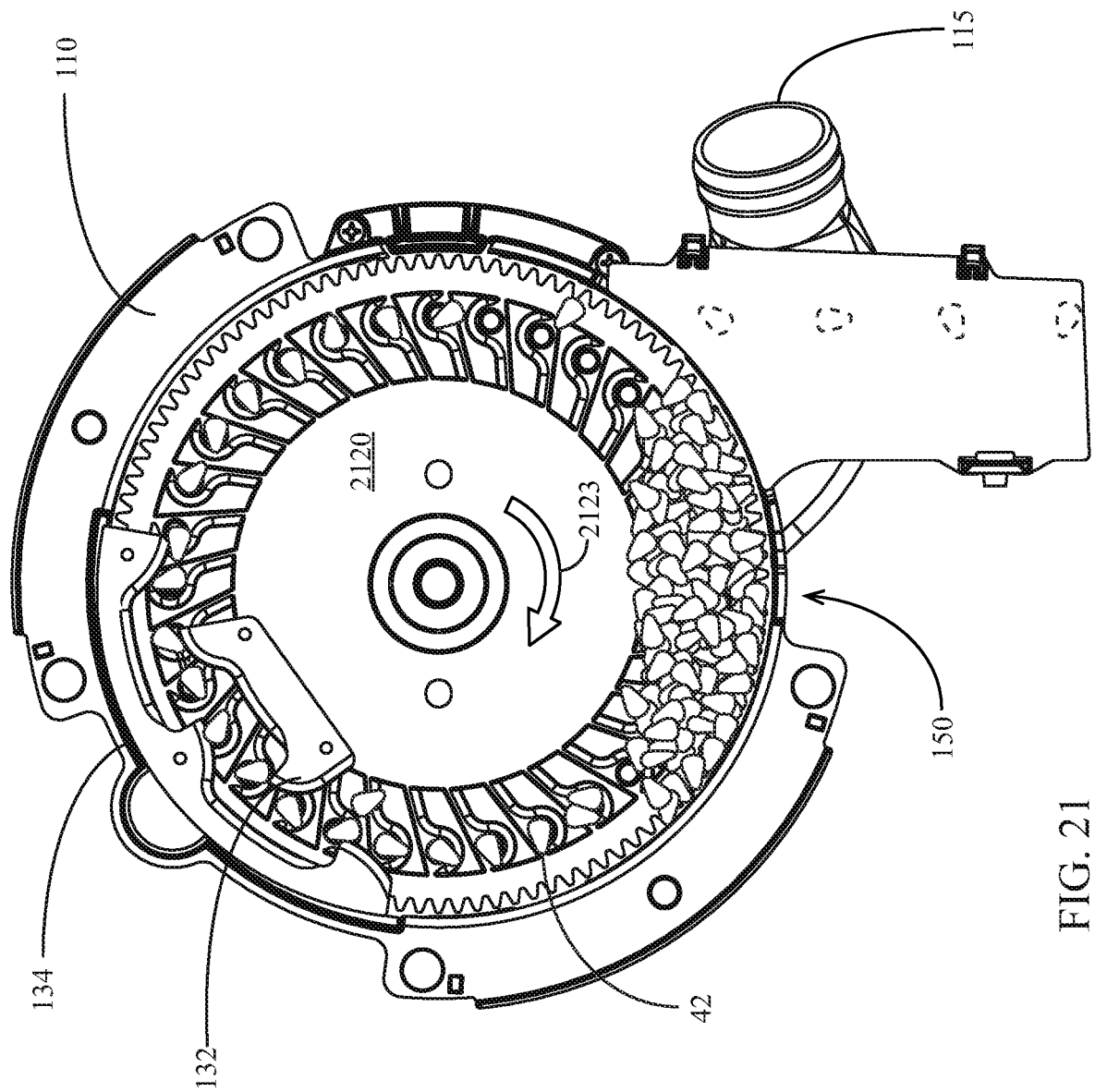
FIG. 21 is a partial side elevation of a seed meter with another embodiment of a seed disc.
Figure 22:
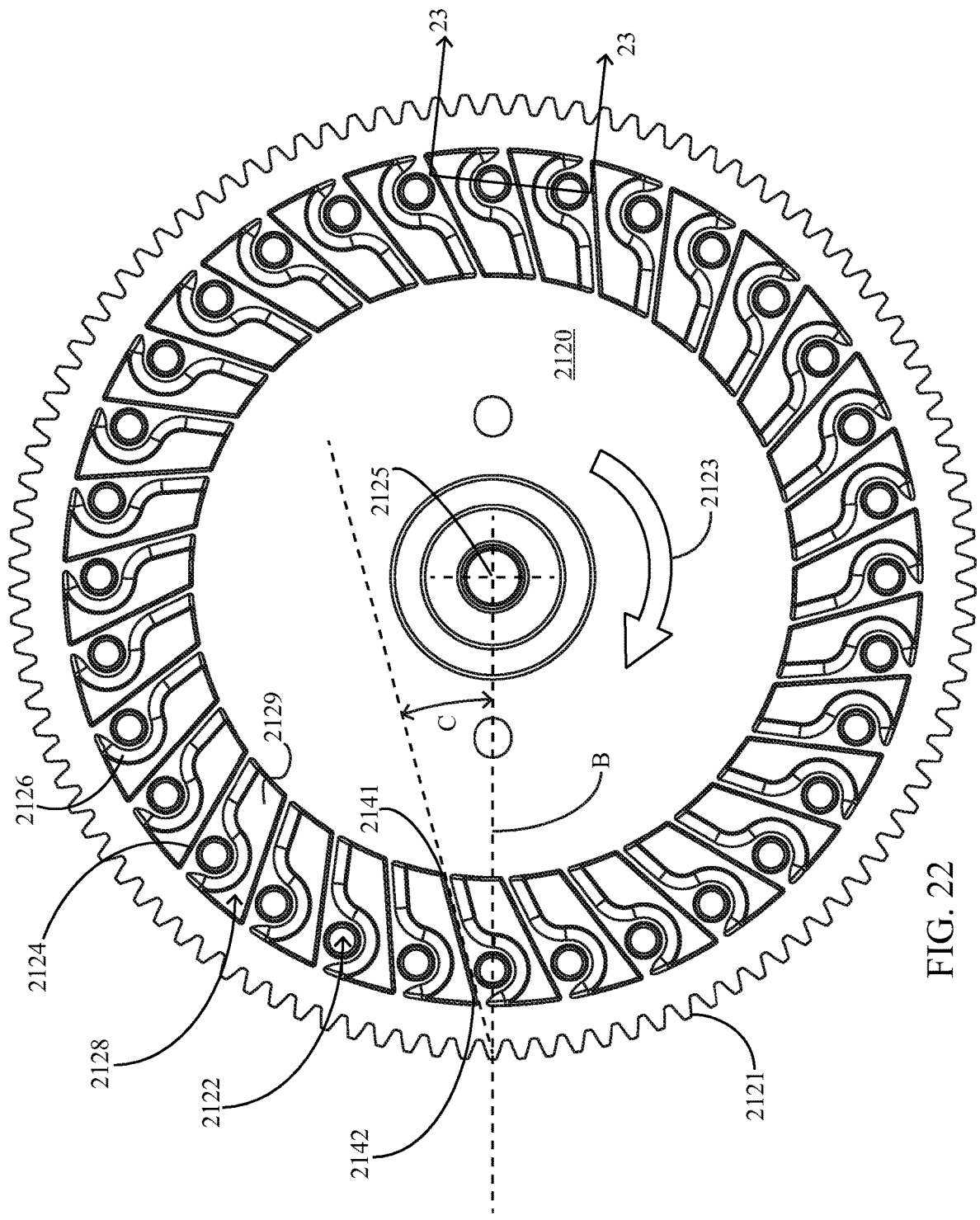
FIG. 22 is an enlarged side elevation view of the seed disc of FIG. 21.

FIG. 21 illustrates an alternative embodiment of a seed disc 2120 shown disposed within the meter housing 110 and which rotates in a clockwise direction of rotation as indicated by arrow 2123 through the seed pool 150. Referring to FIGS. 21 and 22, the seed disc 2120 has a plurality of apertures 2122 spaced radially outward from its central axis 2125. As the apertures 2122 pass through the seed pool between about the 5 o'clock and 7 o'clock position, seeds are entrained over the apertures 2122. The entrained seeds are carried along a seed path (defined by the apertures 2122) in the clockwise direction before being released at approximately the 3 o'clock position.

As illustrated in FIG. 22, the seed disc 2120 preferably includes 32 seed apertures 2122. The seed apertures 2122 are preferably equidistantly arranged at a pitch diameter (e.g., distance between the central axes of each pair of diametrically opposing seed apertures) of approximately 5.5 inches. The seed aperture path has an inner radius defined by an edge of the seed apertures 2122 closest to the center of the disc and an outer radius defined by an edge of the seed apertures 2122 farthest from the center of the disc.

Figure 23:
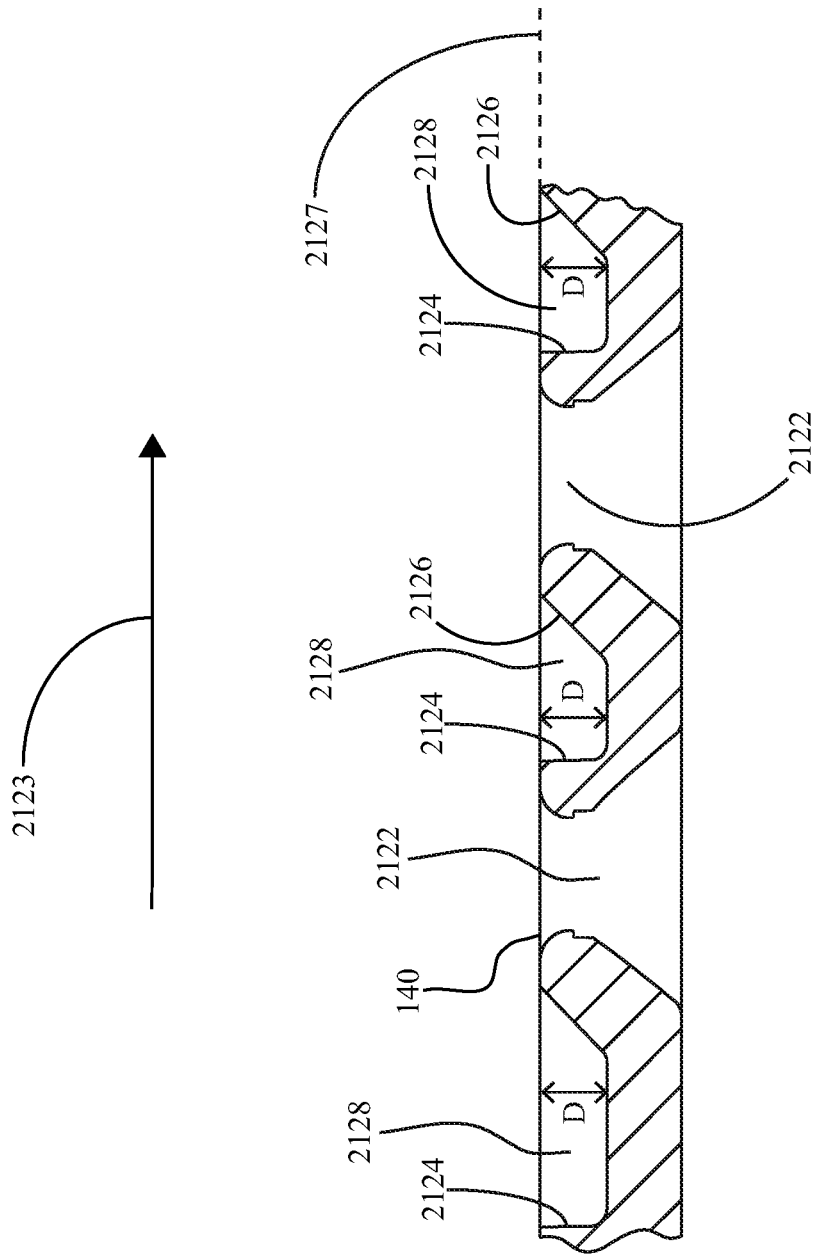
FIG. 23 is a cross-sectional view of the seed disc of FIG. 22 along the section 23-23.

The seed-side surface 140 of the disc 2120 defines a seed plane (indicated by dashed line 2127 in FIG. 23). A plurality of cavities 2128 intersect the seed path and extend a distance toward said central axis 2125. In other words, the cavities 2128 preferably lie in the seed aperture path with a portion of each cavity 2128 preferably being inward of the inner radius of the seed aperture path and a portion of each cavity 2128 preferably being outward of the outer radius of the seed aperture path.

Each cavity 2128 has a recessed surface 2129 recessed a distance D normal to the seed plane 2127. Referring to FIG. 22 together with FIG. 23 (which is a partial cross-sectional view of the seed disc 2120 as viewed along lines 23-23 of FIG. 22), each cavity 2128 includes a forward face 2124 and a rearward face 2126. The forward face 2124 is preferably substantially normal to the seed plane 2127 whereas the rearward face 2126 is sloped from the recessed surface 2129 toward the direction of rotation 2123 at approximately a 45 degree angle.

The cavities 2128 preferably comprise agitation cavities. It should be appreciated that the cavities 2128 serve to aggressively agitate or stir the seed pool because as the cavity enters the seed pool, some of the seeds will substantially enter the cavity and the substantially normal forward face 2124 will push some of the seeds through the seed pool in the direction of rotation 2123 of the disc. An intersection between each cavity 2128 and the seed plane 2127 is preferably substantially larger than an intersection between each seed aperture 2122 and the seed plane 2127, e.g., about three times larger or preferably more. Moreover, in a preferred embodiment, a maximum depth D of each cavity is preferably approximately 0.09 inches and preferably between 0.08 and 0.1 inches. The range of values recited herein is applicable, inter alia, to seed discs used to plant corn seeds, although other seeds may be planted with discs having the same range of depth. It should be appreciated that smaller seeds may be more effectively planted with a seed disc having a smaller cavity depth D, e.g., between 0.05 and 0.08 inches.

Because the cavities 2128 are configured to allow seeds to substantially enter the cavities and to push seeds in the direction of rotation of the seed disc, it is possible for the seed disc to push seeds out of the seed pool and into contact with the singulator 130 such that seeds are forced between the seed disc 2120 and the singulator. In operation, the singulator 130 preferably rides on the seed disc 2120 in a similar fashion to that illustrated in FIG. 11 with respect to the seed disc 120. Thus, in a preferred embodiment, the forward face 2124 of each seed cavity 2128 is preferably disposed at an angle C relative to a line B extending radially from the central axis 2125 through the center of the adjacently counterclockwise aperture 2122 such that the inner edge 2141 of the forward face is angularly forward of the outer edge 2142 of the forward face in the direction of disc rotation. Thus, the forward face 2124 of each cavity 2128 is preferably in a backward-swept orientation relative to the direction of disc rotation. The angle C is preferably an acute angle between about 10 and 30 degrees and preferably about 15 degrees. Additionally, a radially proximal end of the cavity 2128 is preferably substantially angularly forward of a radially distal end of the cavity 2128. Thus, the cavities 2128 are preferably in a backward-swept orientation relative to the direction of disc rotation.

It should be appreciated that if a seed remains in the cavity 2128 when the cavity passes the singulator 130, it is possible for seeds to become wedged in the cavity between the singulator and the seed disc, thus knocking the singulator axially away from the disc and detrimentally affecting the effectiveness of the singulator. In the event that a seed retained in the cavity 2128 contacts the first (most counterclockwise) lower lobe of the singulator 130 (see FIG. 21), the angled disposition of the forward face 2124 allows the seed to slide radially outward and then exit the cavity 2128 as the forward face passes the first lower (i.e., radially inward) lobe of the singulator 130. Additionally, it should be appreciated that the angled forward face 2124 allows seeds to slide downward and radially outward along the forward face and fall from the seed disc 2120, particularly as the seeds are lifted from the seed pool between the 7 o'clock and 9 o'clock positions.

As with the other seed disc embodiments disclosed herein, the seed disc 2120 includes circumferentially arranged drive teeth 2121 configured to enable driving of the disc with a drive gear. The drive gear is preferably driven by an electric motor as described in U.S. Pat. Nos. 6,752,095 and 7,617,785, the disclosures of which are hereby incorporated herein in their entirety by reference.

Although the various improvements described herein are illustrated with respect to a vacuum-type seed meter, they would be equally applicable to other seed singulating meters, including positive-air meters such as that disclosed in U.S. Pat. No. 4,450,979 to Deckler, incorporated herein in its entirety by reference.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A seed singulator for a seed meter, the seed meter including a seed disc rotatably mounted within a meter housing about an axis of rotation, the seed disc having a plurality of seed apertures therethrough, a seed-side surface and a vacuum-side surface, whereby the rotation of the seed disc in a direction of rotation about the axis of rotation defines a seed aperture path, the meter housing including a seed housing covering the seed-side surface of the seed disc and a vacuum housing covering the vacuum-side surface of the seed disc, the seed housing holding a pool of seeds which seeds become entrained over the seed apertures as the seed apertures rotate in the direction of rotation along the seed aperture path through the pool of seeds, the seed singulator comprising:

an upper lobe plate having at least one upper lobe extending in a direction toward the axis of rotation;
a lower lobe plate having at least one lower lobe extending in a direction away from the axis of rotation;
a base;
at least one arm connecting said upper lobe plate with said base;
at least one arm connecting said lower lobe plate with said base;
a radial spring mounted to the seed housing and operably biasing said upper lobe plate and said lower lobe plate radially with respect to the seed disc and relative to the seed aperture path;
an axial spring mounted to the seed housing and adapted to removably receive said base, said axial spring operably biasing said upper lobe plate and said lower lobe plate axially with respect to the axis of rotation and against the seed-side surface of the seed disc;
whereby the upper lobe plate is disposed radially outward relative to said seed aperture path and said lower lobe plate is disposed radially inward relative to said seed aperture path such that said at least one upper lobe and said at least one lower lobe bumps the seeds entrained over the seed apertures as the entrained seeds rotate past said at least one upper lobe and said at least one lower lobe in the direction of rotation along the seed aperture path.

2. The seed singulator of claim 1, wherein said axial spring is elastically deformable.

3. The seed singulator of claim 1, wherein said axial spring comprises spring steel.

4. The seed singulator of claim 1, wherein said axial spring includes mounting ears that deflect to removably receive said base.

5. The seed singulator of claim 1, wherein said upper lobe plate includes three spaced upper lobes.

6. The seed singulator of claim 5, wherein said lower lobe plate includes two spaced lower lobes.

7. The seed singulator of claim 1, wherein said upper lobe plate includes a leading annular surface, a trailing annular surface and a central annular surface between said leading and trailing annular surfaces, wherein each of said leading and trailing annular surfaces are disposed at a radius with respect to the axis of rotation that approximates an outer radial perimeter of the seed disc such that the outer radial perimeter of the seed disc contacts said leading and trailing annular surfaces, and wherein said central annular surface has a radius such that said central annular surface does not contact the outer radial perimeter of the seed disc.

8. The seed singulator of claim 7, wherein said upper lobe plate includes a leading chamfer adjacent to said leading annular surface.

9. The seed singulator of claim 8, wherein said upper lobe plate includes a trailing chamfer adjacent to said trailing annular surface.

10. The seed singulator of claim 7, wherein said leading and trailing annular surfaces are concentric.

\* \* \* \* \*